United States Patent
Nishikawa et al.

(10) Patent No.: US 9,472,193 B2
(45) Date of Patent: Oct. 18, 2016

(54) SPEECH DIALOGUE CONTROL METHOD

(71) Applicant: Panasonic Intellectual Property Corporation of America, Torrance, CA (US)

(72) Inventors: Yuri Nishikawa, Osaka (JP); Katsuyoshi Yamagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/702,259

(22) Filed: May 1, 2015

(65) Prior Publication Data

US 2015/0235642 A1    Aug. 20, 2015

Related U.S. Application Data

(63) Continuation of application No. PCT/JP2014/004255, filed on Aug. 20, 2014.

(60) Provisional application No. 61/873,115, filed on Sep. 3, 2013.

(30) Foreign Application Priority Data

Jul. 24, 2014   (JP) .................................. 2014-150870

(51) Int. Cl.
   *G10L 17/00*   (2013.01)
   *G10L 15/02*   (2006.01)

(52) U.S. Cl.
   CPC ............... *G10L 17/00* (2013.01); *G10L 15/02* (2013.01)

(58) Field of Classification Search
   USPC .................................................. 704/246–252
   See application file for complete search history.

(56) References Cited

U.S. PATENT DOCUMENTS

| 7,136,817 | B2 | 11/2006 | Schroder et al. | |
| 7,835,914 | B2 * | 11/2010 | Mizutani | G10L 15/22 704/1 |
| 7,949,517 | B2 * | 5/2011 | Eckert | G10L 15/22 379/88.05 |
| 7,983,912 | B2 * | 7/2011 | Hirakawa | G10L 15/22 704/231 |
| 8,195,467 | B2 * | 6/2012 | Mozer | G10L 15/30 704/270 |
| 9,093,075 | B2 * | 7/2015 | Alameh | G10L 15/26 |
| 2002/0035477 | A1 | 3/2002 | Schroder et al. | |
| 2007/0203699 | A1 | 8/2007 | Nagashima | |

(Continued)

FOREIGN PATENT DOCUMENTS

JP    2002-123295    4/2002

OTHER PUBLICATIONS

International Search Report of PCT application No. PCT/JP2014/004255 dated Dec. 2, 2014.

(Continued)

*Primary Examiner* — Leonard Saint Cyr
(74) *Attorney, Agent, or Firm* — Greenblum & Bernstein, P.L.C.

(57) ABSTRACT

A cloud server extracts voiceprint data from voice data of a user, and distinguishes the user. The cloud server identifies a task which the user instructs, from the voice data of the user. If contexts required to execute the task have not been amassed, the cloud server registers the distinguished user as a task owner, and notifies the user with a reply sentence to cause the user to speak the required context. If the voiceprint data of the voice data which the user has uttered matches the voiceprint data of the user A, and all required contexts are amassed, the cloud server causes a device to execute the task.

13 Claims, 30 Drawing Sheets

(56) References Cited

U.S. PATENT DOCUMENTS

| | | | |
|---|---|---|---|
| 2008/0059167 A1* | 3/2008 | Poultney | G10L 15/07 |
| | | | 704/231 |
| 2008/0059188 A1 | 3/2008 | Konopka et al. | |
| 2008/0162146 A1* | 7/2008 | Eckert | G10L 15/22 |
| | | | 704/275 |
| 2013/0251119 A1* | 9/2013 | Akolkar | H04M 3/5166 |
| | | | 379/88.02 |
| 2014/0257811 A1* | 9/2014 | Lavallee | G06F 17/30976 |
| | | | 704/244 |

OTHER PUBLICATIONS

The Extended European Search Report, dated May 18, 2016, for the related European Patent Application No. 14842716.4.

* cited by examiner

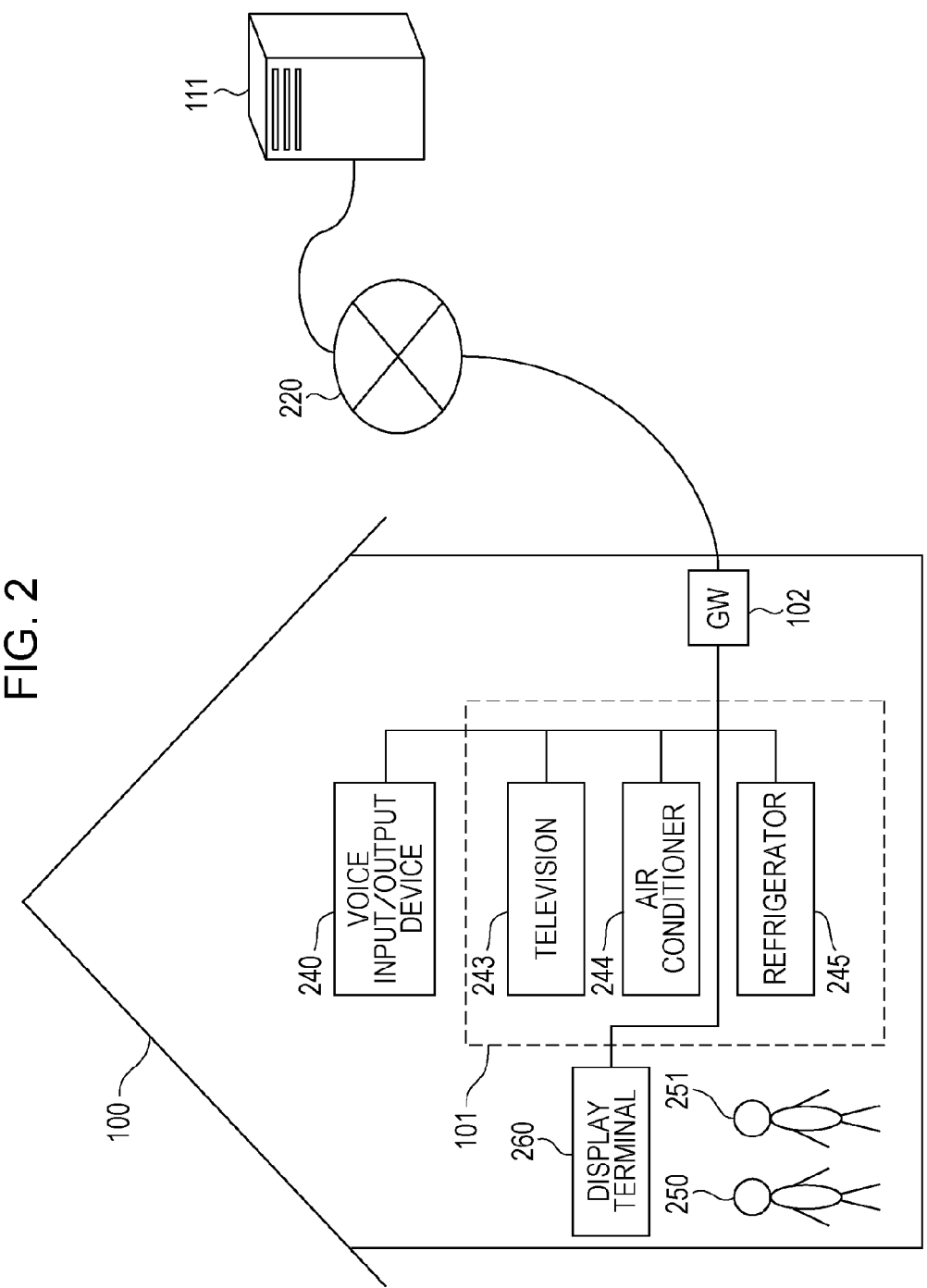

FIG. 12

| USER ID | VOICEPRINT FILE | ~610 |
|---|---|---|
| P01 | S01.dat | |
| P02 | S02.dat | |
| | | |

FIG. 13

| GW-ID | DEVICE ID | TYPE | OPERATING TASK ID | DIALOGUE STATE | TASK OWNER |
|---|---|---|---|---|---|
| G001 | M01 | TELEVISION | T0105 | AWAITING INPUT | P01 |
| | M02 | REFRIGERATOR | T0208 | AWAITING INPUT | P02 |
| | M03 | AIR CONDITIONER | NONE | NEUTRAL | |
| | ... | ... | ... | ... | ... |
| G002 | ... | ... | ... | ... | ... |
| | ... | ... | ... | ... | ... |

| DEVICE ID | TASK ID | TASK DESCRIPTION |
|---|---|---|
| M01 (TELEVISION) | T0101 | CHANGE CHANNELS |
|  | T0102 | CHANGE VOLUME |
|  | T0103 | PROGRAMMING SETTINGS |
|  | T0104 | OBTAIN NEWS INFORMATION |
|  | T0105 | OBTAIN WEATHER INFORMATION |
|  | ... | ... |
| M02 (REFRIGERATOR) | T0201 | TEMPERATURE SETTINGS |
|  | T0202 | TAKE INVENTORY |
| ... | ... | ... |

| WORD ID | WORD | TYPE | CONCEPT OR TASK ID |
|---|---|---|---|
| W001 | HOKKAIDO | <place> | <hokkaido> |
| W002 | AOMORI | <place> | <aomori> |
|  | ... |  |  |
| W010 | TODAY | <date> | <today> |
| W011 | TONIGHT | <date> | <tonight> |
| W012 | TOMORROW | <date> | <tomorrow> |
|  | ... |  |  |
| W100 | NEWS | <task> | T01014 |
| W101 | WEATHER | <task> | T01015 |

FIG. 16

| DEVICE ID | TASK ID | TYPE | ITEM IMPORTANCE | CONCEPT | EXECUTION WHEN VALUE IS NOT INPUTTED | EXECUTION WHEN VALUE IS INPUTTED |
|---|---|---|---|---|---|---|
| M01 (TELEVISION) | T0105 OBTAIN WEATHER INFORMATION | \<date\> | REQUIRED | — | REPLY: "WEATHER FOR WHEN?" | CONTROLLED DEVICE: TELEVISION PROCESS: OBTAIN WEATHER INFORMATION OF \<date\> AT \<place\>, AND DISPLAY ON TELEVISION SCREEN REPLY: "DISPLAYING WEATHER OF \<date\> AT \<place\>" |
| | | \<place\> | OPTIONAL | \<osaka\> | | CONTROLLED DEVICE: TV PROCESS: OBTAIN WEATHER INFORMATION OF \<date\> OF \<place\>, AND DISPLAY ON TV SCREEN REPLY: "DISPLAYING WEATHER OF \<date\> OF \<place\>" |
| | | ⋮ | ⋮ | ⋮ | | |
| | Default | — | — | — | REPLY: "WHICH TASK DO YOU WANT TO PERFORM?" | — |
| Default | | | | | | REPLY: "YOU CANNOT USE THIS DEVICE." |

640

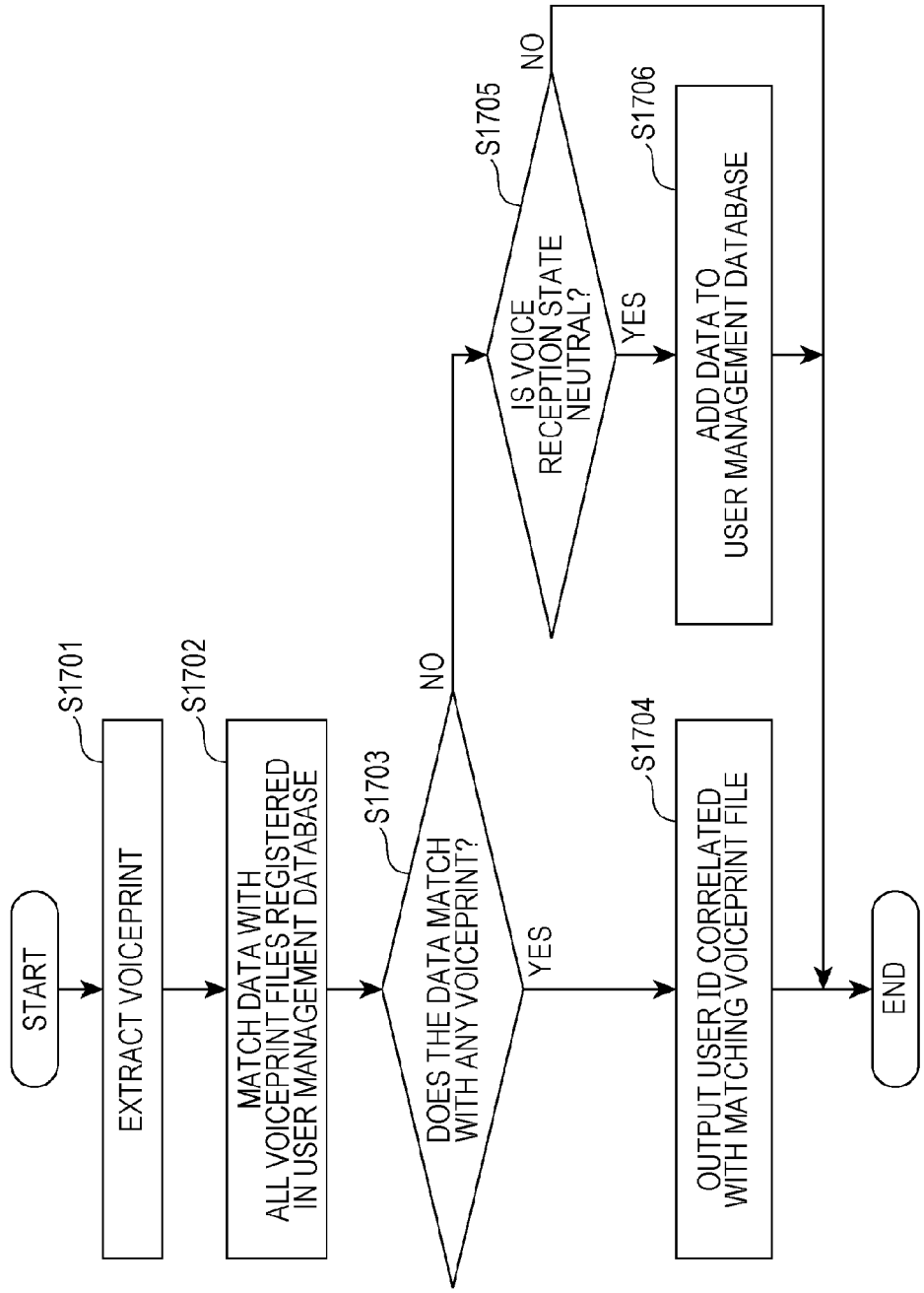

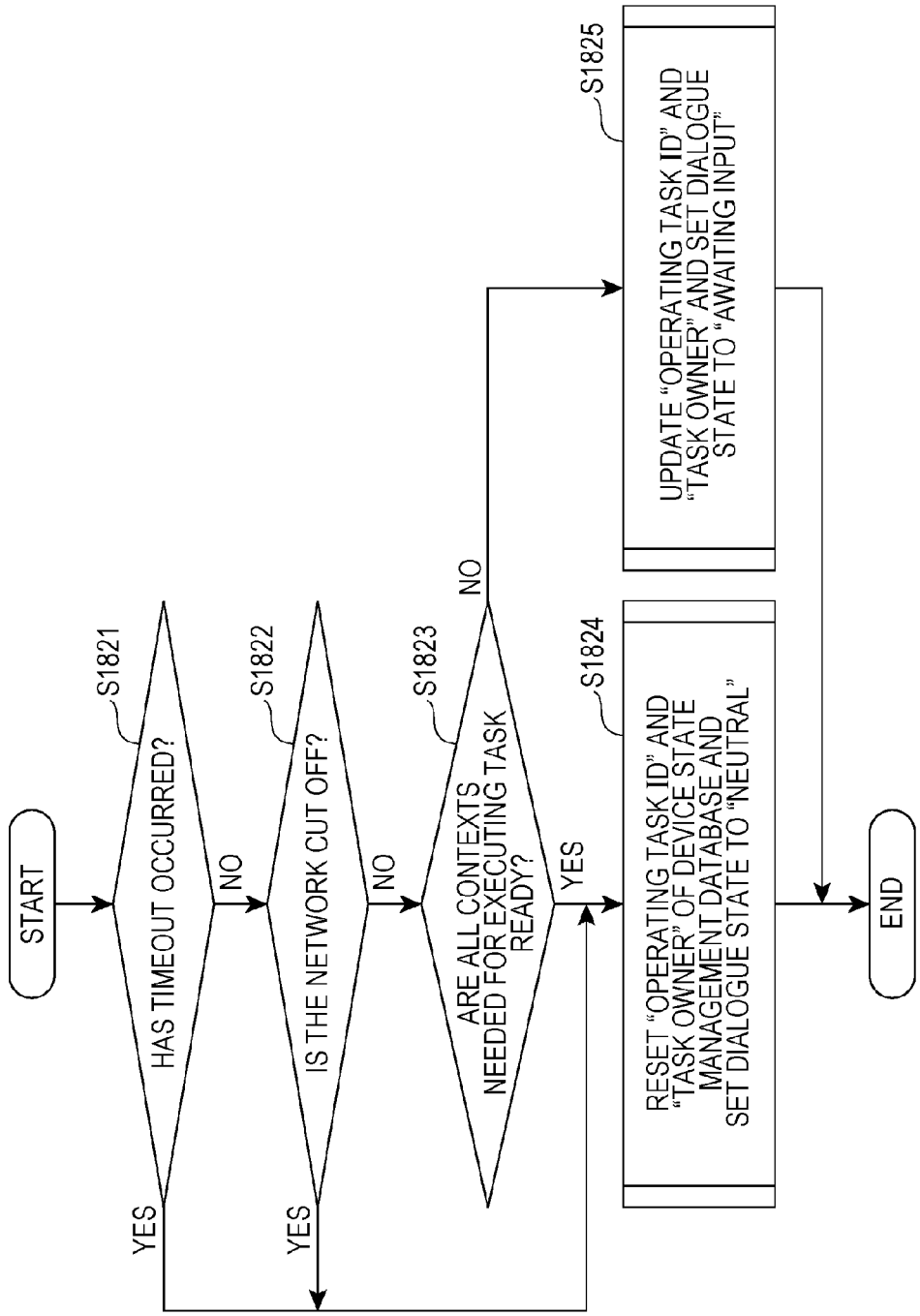

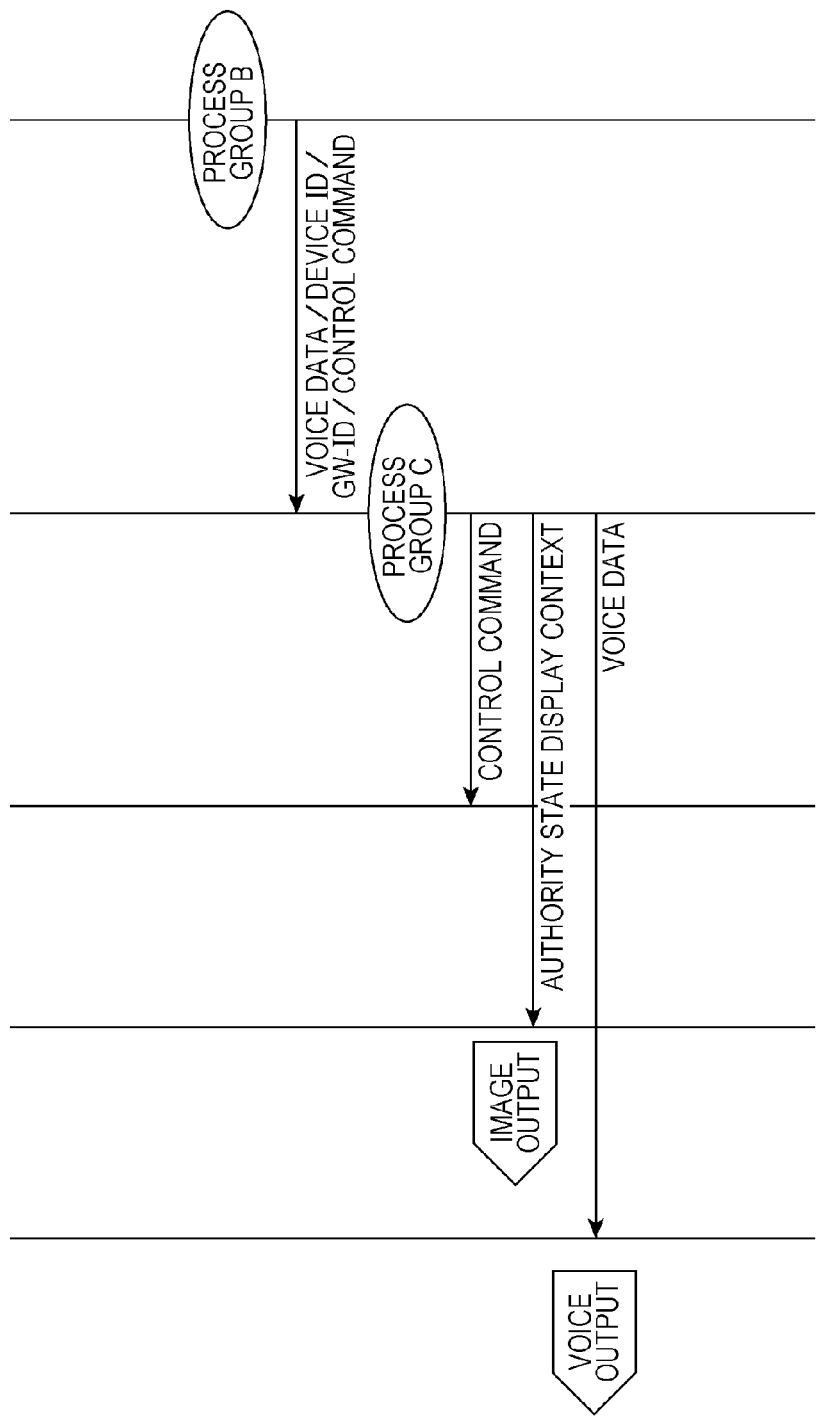

| DEVICE ID | TYPE | OPERATING TASK ID | DIALOGUE STATE | TASK OWNER |
|---|---|---|---|---|
| M01 | TELEVISION | T0105 | AWAITING INPUT | P01 |
| M02 | REFRIGERATOR | T0208 | AWAITING INPUT | P02 |
| M03 | AIR CONDITIONER | NONE | NEUTRAL | |
| ... | ... | ... | ... | ... |

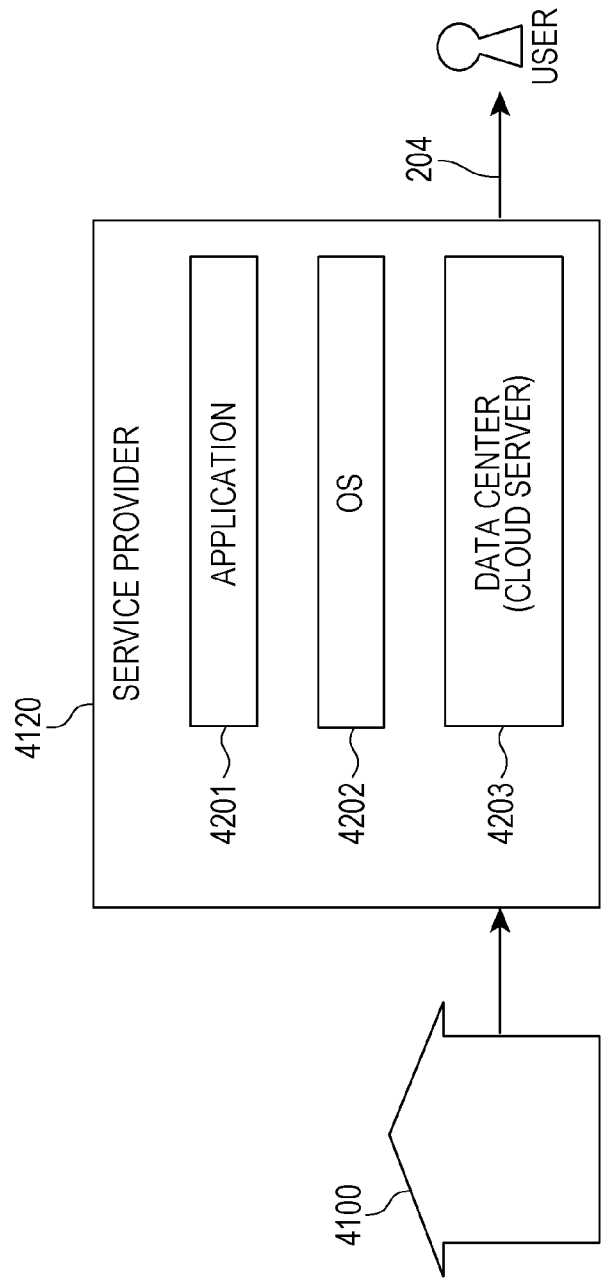

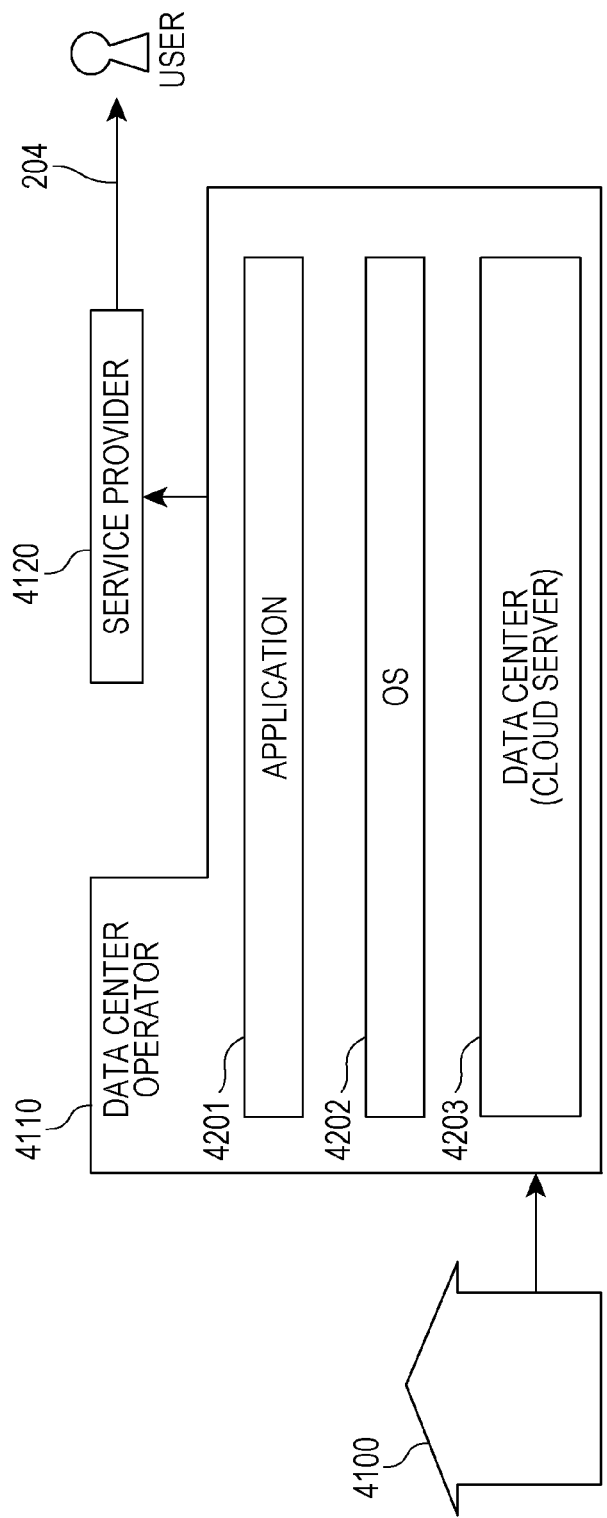

SPEECH DIALOGUE CONTROL METHOD

BACKGROUND

1. Technical Field

The present disclosure relates to a speech dialogue control method in a speech dialogue system.

2. Description of the Related Art

Japanese Unexamined Patent Application Publication No. 2002-123295 discloses an example of the background art, in which a method and device are used to perform spoken control of a device relating to consumer appliances using spoken commands.

In this method and device, a spoken command to turn on the device is received from a particular user, the features of the voice are identified, and only in a case where the additional spoken command is identified as having been uttered by this user, is the additional spoken command accepted. Accordingly, only commands from this user can be accepted even in an environment where there is much noise, such as people other than the user talking in the vicinity. However, the above-described related art has needed further improvement.

SUMMARY

In one general aspect, the techniques disclosed here feature a speech dialogue control method of a speech dialogue system where connection is made to a voice input device that inputs user voice. The method includes: receiving first instruction information, representing a first instruction content as to the speech dialogue system, from the voice input device; extracting first voice information, indicating a voice feature value of the user who has input the first instruction information, contained in the received first instruction information, and recognizing a first instruction content which the first instruction information represents; performing instruction request notification, in a case where the recognition result of the first instruction content is that processing to be executed could not be uniquely identified based on the first instruction content, thereby prompting the user to input information necessary for uniquely identifying the processing; extracting, from utterance information which is voice uttered by the user that has been received from the voice input device after the instruction request notification, second voice information indicating a voice feature value of the user who has input this utterance information, and determining whether or not the first voice information and the second voice information that have been extracted match; and in a case where determination is made that the first voice information and the second voice information do not match, executing processing to make notification to the effect that input of the utterance information cannot be accepted, or not executing processing identified based on the first instruction content and the voice information that have been input.

These general and specific aspects may be implemented using a system, a method, and a computer program, and any combination of systems, methods, and computer programs.

According to the above aspect, further improvement can be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a configuration diagram of a speech dialogue system according to a first embodiment;

FIG. 12 is a diagram illustrating a specific example of a user management database according to the first embodiment;

FIG. 13 is a diagram illustrating a specific example of a device state management database according to the first embodiment;

FIG. 14 is a diagram illustrating a specific example of a device function management database according to the first embodiment;

FIG. 15 is a diagram illustrating a specific example of an utterance comprehension dictionary database according to the first embodiment;

FIG. 16 is a diagram illustrating a specific example of dialogue frame database according to the first embodiment;

FIG. 17 is a flowchart illustrating details of speaker identification processing according to the first embodiment;

FIG. 18C is a flowchart illustrating details of updating processing of the device state management database according to the first embodiment;

FIG. 21 is a sequence diagram of communication processing performing user restriction in the speech dialogue system according to the first embodiment;

FIG. 27 is a diagram illustrating an overall image of service provided by a speech dialogue system according to a type 1 service (in-house data center type cloud service);

FIG. 30 is a diagram illustrating an overall image of service provided by a speech dialogue system according to a type 4 service (SaaS usage type cloud service).

DETAILED DESCRIPTION

Figure 1A:
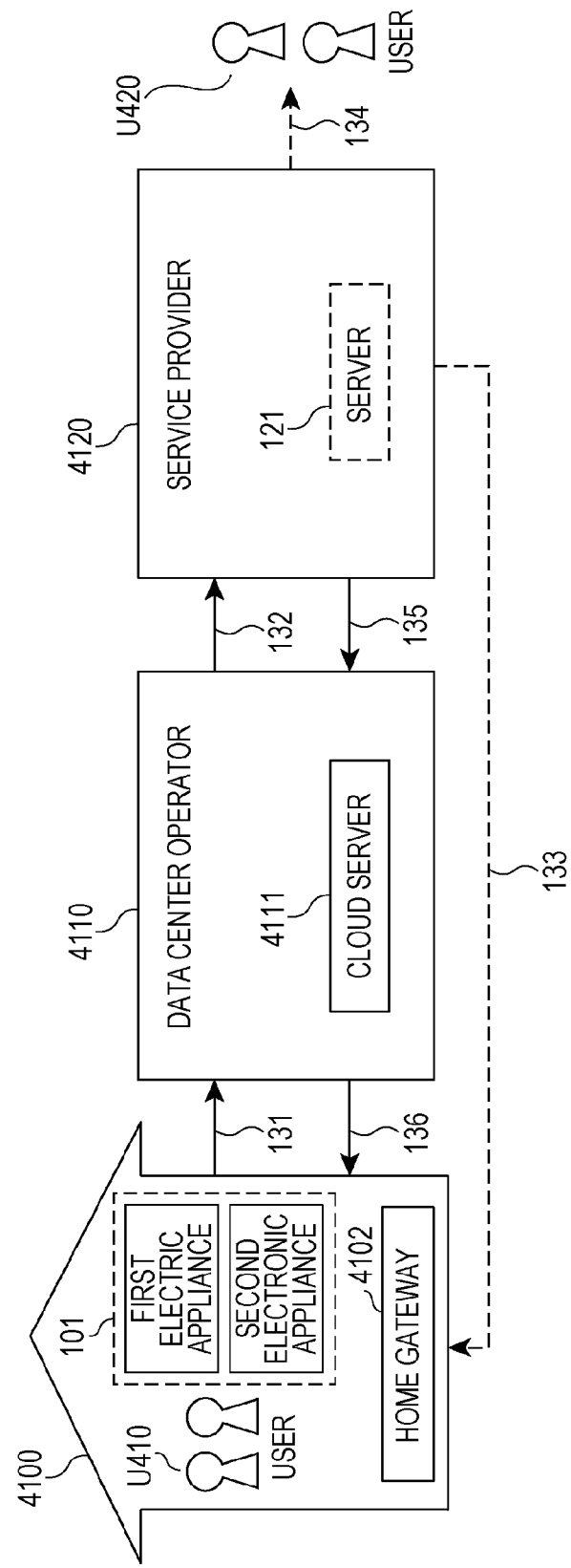
FIG. 1A is a diagram illustrating an overall image of service provided by a speech dialogue system according to an embodiment.

Underlying Knowledge Forming Basis of the Present Disclosure

The present inventors have found that the following problems occur in the conventional art.

The method and device in the above-described Japanese Unexamined Patent Application Publication No. 2002-123295 can identify a spoken command to turn the device on from a first user in an environment where there are two or more users, accepting additional spoken commands only from the first user. However, this method and device can accept spoken commands again from another user only after the first user has turned the device off. Accordingly, the present inventors have found that there is a problem with this method and device when two or more users use the same device at the same time, in that even though the first user considers a series of control to have ended, but spoken commands of other users cannot be accepted unless the first user turns the device off.

Specifically, an example will be considered regarding a case where a user A and a user B are watching the same television set in a house, and the user A asks the television set, "What will the weather for Osaka be tomorrow?" and the television set provides the user A with the weather information, whereupon the series of dialogue relating to the weather ends. If the user B wants to say, "Give me the baseball scores for today", there has been the need for the user A to temporarily turn the television set off in the conventional art. However, the contents of the information which the television set is to provide to the user A and the user B are independent from each other, since they are "weather information" and "professional baseball results", and it is desirable that each user would be able to acquire his/her own desired information without turning the television set off.

In order to appropriately handle such a state, it is important that the speech dialogue system be able to appropriately comprehend whether or not a dialogue with a user relating to a particular dialogue content (e.g., weather) has ended, and control whether or not additional spoken commands should be acceptable from any user.

The following improvement measures have been studied in the present disclosure to solve this problem. According to an aspect of a speech dialogue control method of a speech dialogue system where connection is made to a voice input system that inputs user voice to solve the above-described problem, the method includes: receiving first instruction information, representing a first instruction content as to the speech dialogue system, from the voice input device; extracting first voice information, indicating a voice feature value of the user who has input the first instruction information, contained in the received first instruction information, and recognizing a first instruction content which the first instruction information represents; performing instruction request notification, in a case where the recognition result of the first instruction content is that processing to be executed could not be uniquely identified based on the first instruction content, thereby prompting the user to input information necessary for uniquely identifying the processing; extracting, from utterance information which is voice uttered by the user that has been received from the voice input device after the instruction request notification, second voice information indicating a voice feature value of the user who has input this utterance information, and determining whether or not the first voice information and the second voice information that have been extracted match; and in a case where determination is made that the first voice information and the second voice information do not match, executing processing to make notification to the effect that input of the utterance information cannot be accepted, or not executing processing identified based on the first instruction content and the voice information that have been input.

Accordingly, in a case where the user A has performed a particular instruction to the speech dialogue system, following which there has been a response from the speech dialogue system regarding the instruction, for example, the user who can perform further instruction as to this response can be restricted to the user A.

Specifically, in a case where the user A performs spoken instruction of "Turn on the television" to the speech dialogue system, indicating the first instruction content, and the speech dialogue system receives the first instruction information which is the voice information representing the spoken instruction, the speech dialogue system extracts first voice information indicating a voice feature value of the user A from the first instruction information. In a case where the processing to be executed based on the first instruction content could not be uniquely identified from the recognizing result of the first instruction content, the speech dialogue system gives an instruction request notification to prompt the user to input necessary information so the processing can be uniquely identified, such as "What channel shall I show?" for example.

Second voice information indicating the voice feature value of the user is extracted from the utterance information, which is the speech which the user has uttered, and in a case where the first voice information and second voice information do not match, processing is executed to make notification to the effect that input of the utterance information cannot be accepted, or the processing is not executed.

For example, in a case where an instruction request notification has been performed, and the number "three" is spoken in a conversation between a user B and a user C nearby the user A, determination is made regarding whether or not the user B or C who has uttered the speech "three" matches the user A. If a determination result is obtained that these do not match, notification is made by the speech dialogue system that changing the channel to channel "three" cannot be performed. Thus, a situation, where by speech dialogue system malfunctions by the speech dialogue system accepting a voice instruction by the user B or C other than the user A who has made the initial utterance, can be avoided.

The user who can respond is restricted for each process, so the user who can respond can be changed without initialization processing such as turning off the power of the speech dialogue system, or the like. As a result, it is unnecessary to take time for the initialization processing of the speech dialogue system and so forth.

Also, in the above aspect, in a case where second instruction information indicating a second instruction content to uniquely identify the processing has been received from the voice input device as the utterance information after the instruction request notification, the second instruction content which the second instruction information represents may be recognized. Processing to be executed may be uniquely identified based on the recognition result of the first instruction content and the second instruction content. Second voice information indicating a voice feature value of the user who has input the second instruction information may be extracted from the second instruction information. Whether or not the first voice information and the second voice information match may be determined.

In this case, in a case where second instruction information indicating a second instruction content to uniquely identify the processing has been received after the instruction request notification, the second instruction content is first recognized from the second instruction information, and processing to uniquely identify the processing executed based recognition results of on the first instruction content and the second instruction content. The second voice information indicating the voice feature value of the user who has input the second instruction information is extracted, and processing to determine whether or not the first voice information and the second voice information match is executed.

Accordingly, processing to uniquely identify the processing and processing to determine whether or not the first voice information and the second voice information match, are performed simply by the user uttering speech indicating the second instruction content. Thus, the user is not requested to speak multiple times for each process, and accordingly the user can smoothly proceed with instructing the speech dialogue system.

Also, in the above aspect, in a case where the first voice information and the second voice information match, a speech content which the received utterance information represents may be recognized, the processing to be executed may be uniquely identified based on the first instruction content and the recognition results of the speech content, and the identified processing may be executed.

In this case, the processing is executed under the condition that the first voice information and the second voice information match, so only the instruction from the user A who has input the first instruction information is accepted. Consequently, processing against the intent of the user A can be prevented from being performed.

Also, in the above aspect, the extracted first speech information may be stored in memory, the first speech information may be read out from the memory, and whether or not the first voice information and the second voice information match be determined.

In this case, the first voice information is temporarily stored in the memory, so a situation where the first voice information does not exist in the speech dialogue system at the time of extracting the second voice information can be avoided.

Also, in the above aspect, the identified processing may be search processing to search for any information.

In this case, in a case where the speech dialogue system asks back for a keyword which the user has instructed by utterance, for the purpose of confirmation, the user who can respond to this asking back from the speech dialogue system can be restricted to the user who instructed the keyword search first. Consequently, search results against the intent of the user can be prevented from being obtained.

Also, in the above aspect, the speech dialogue system may be further connected to an electric appliance, and the identified processing may be control processing to control operations of the electric appliance.

In this case, the speech dialogue system does not accept voice instructions from the users B and C, other than the user A who first instructed the electric appliance by voice, thereby preventing the electric appliance from operating other than intended.

Also, in the above aspect, in a case where execution of the identified processing has ended, the speech dialogue between the user and the speech dialogue system may be ended, and a speech reception state of the speech dialogue system set to neutral.

In this case, the speech dialogue system sets the speech reception state to neutral when execution of the processing has ended, so the speech dialogue system can execute the next processing without the user having to perform the work of returning the speech reception state to neutral.

Also, in the above aspect, in a case where a predetermined amount of time elapses after the instruction request notification, the speech dialogue between the user and the speech dialogue system may be ended, and a speech reception state of the speech dialogue system set to neutral.

In this case, the speech dialogue system automatically sets the speech reception state to neutral after a predetermined amount of time elapses, so a situation can be avoided where voice of the user B is not accepted by the speech dialogue system for an unlimited amount of time, even if the user A does not input utterance information after the instruction request notification, for example.

Also, in the above aspect, the voice input device and the speech dialogue system may be connected by a network, and in a case of detecting that connection by the network has been cut off after the instruction request notification, the speech dialogue between the user and the speech dialogue system may be ended, and a speech reception state of the speech dialogue system set to neutral.

In this case, the speech dialogue system automatically sets the speech reception state to neutral when cutoff of the network is detected, thereby avoiding a situation where the user A continues to input utterance information without knowing that the network has been cut off after the instruction request notification, for example.

Also, in the above aspect, the voice input device and the speech dialogue system may be connected by a network, and in a case of detecting that connection by the network has been cut off after the instruction request notification, the speech dialogue between the user and the speech dialogue system may be ended, and the user notified that the network has been cut off. In this case, the user is notified of the network cutoff when the cutoff of the network is detected, thereby enabling the user to recognize after the instruction request notification that input of utterance information is useless, thereby preemptively avoiding needless work.

Also, in the above aspect, notification to the user that the network has been cut off may be performed by outputting voice indicating the cutoff. In this case, cutoff of the network is notified by voice, so the user can be made to recognize the cutoff of the network, without forcing the user to perform work of viewing a display terminal, for example.

Also, in the above aspect, notification to the user that the network has been cut off may be performed by outputting an image indicating the cutoff. In this case, the user can be made to recognize the cutoff of the network by way of an image.

Also, in the above aspect, the identified processing may be executed in a case where determination is made that the first voice information and the second voice information match. In this case, the processing is executed under the condition that the first voice information and the second voice information match, so only instructions from the user A who input the first instruction information are accepted. Consequently, processing against the intent of the user A can be prevented from being performed.

These general or specific aspects may be realized by a system, method, integrated circuit, computer program, or computer-readable recording medium such as a CD-ROM, and may be realized by any combination of a system, method, integrated circuit, computer program, and recording medium. Specific description will be made below regarding embodiments, with reference to the drawings.

Note that the embodiments described below are all specific examples of the present disclosure. Values, shapes, components, steps, orders of steps, and so forth in the following embodiments are only exemplary, and do not restrict the present disclosure. Components in the following embodiments which are not included in an independent Claim indicating the highest concept are described as being optional components. Also, in all of the embodiments the contents of each can be combined.

Overall Image of Service to be Provided

First, an overall image of the service which the speech dialogue system provides, according to an embodiment, will be described.

FIG. 1A is a diagram illustrating an overall image of a service provided by a speech dialogue system according to the present embodiment. The speech dialogue system includes a group 4100, a data center operator 4110, and a service provider 4120.

The group 4100 is, for example, a corporation, an organization, a home, or the like. The scale thereof is irrelevant. The group 4100 has multiple electric appliances 101 including a first electric appliance and a second electric appliance, and a home gateway 4102. The multiple electric appliances 101 include those which are capable of connecting to the Internet, (e.g., a smartphone, personal computer (PC), television set, etc.). The multiple electric appliances 101 also include those which are incapable of connecting to the Internet on their own (e.g., lighting, washing machine, refrigerator, etc.). There may be in the multiple electric appliances 101 those which are incapable of connecting to the Internet on their own but can be connected to the Internet via the home gateway 4102. A user U410 also uses the multiple electric appliances 101 within the group 4100.

The data center operator 4110 includes a cloud server 4111. The cloud server 4111 is a virtual server which collaborates with various devices over the Internet. The cloud server 4111 primarily manages so-called "big data" or the like that is difficult to handle with normal database management tools and the like. The data center operator 4110 manages data, manages the cloud server 4111, and serves as an operator of a data center which performs the management. The services provided by the data center operator 4110 will be described in detail later.

Figure 1B:
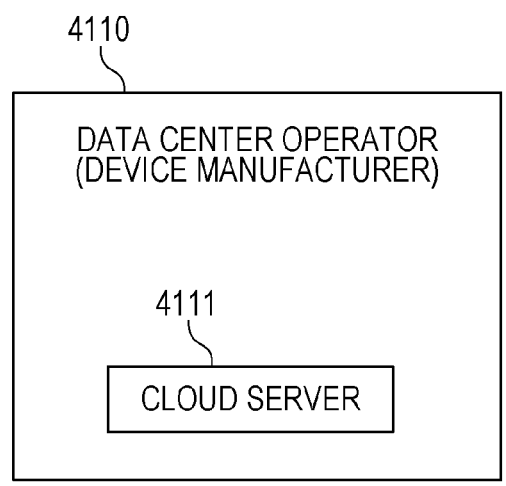
FIG. 1B is a diagram illustrating an example where a device manufacturer serves as a data center operator.
Figure 1C:
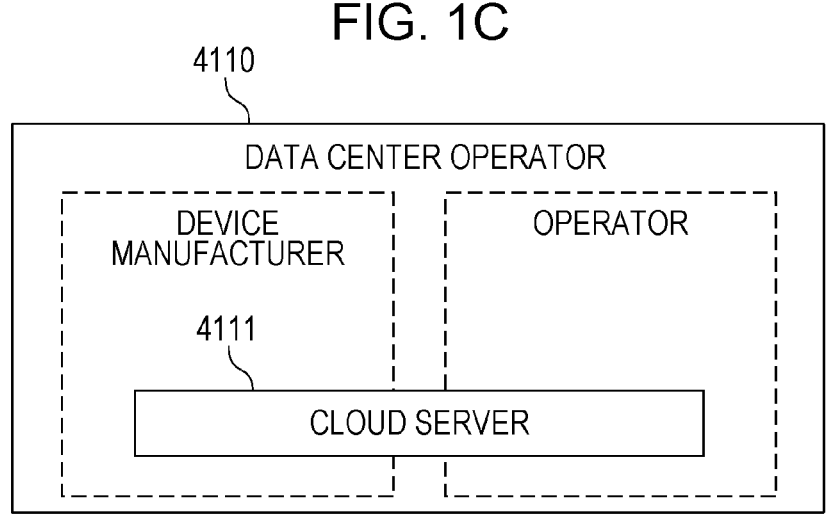
FIG. 1C is a diagram illustrating an example where either one of a device manufacturer and a management company serves as a data center operator.

Now, the data center operator 4110 is not restricted just to management of data and management of the cloud server 4111. For example, in a case where an appliance manufacturer which develops or manufactures one of the electric appliances of the multiple electric appliances 101 manages the data or manages the cloud server 4111 or the like, the appliance manufacturer serves as the data center operator 4110, as illustrated in FIG. 1B. Also, the data center operator 4110 is not restricted to being a single company. For example, in a case where a appliance manufacturer and a management company manage data or manage the cloud server 4111 either conjointly or in shared manner, as illustrated in FIG. 1C, both, or one or the other, serve as the data center operator 4110.

The service provider 4120 includes a server 121. The scale of the server 121 here is irrelevant, and can be memory or the like in a PC used by an individual, for example. Further, there may be cases where the service provider 4120 does not include a server 121.

Note that the home gateway 4102 is not indispensable to the above-described system. In a case where the cloud server 4111 performs all data management for example, the home gateway 4102 is unnecessary. Also, there may be cases where there are no devices incapable of Internet connection by themselves, such as in a case where all devices in the home are connected to the Internet.

Next, the flow of information in the above-described speech dialogue system will be described. The first electric appliance and the second electric appliance in the group 4100 each transmit log information to the cloud server 4111 of the data center operator 4110. The cloud server 4111 collects log information from the first electric appliance and second electric appliance (arrow 131 in FIG. 1A).

Here, log information is information indicating the operating state of the multiple electric appliances 101 for example, date and time of operation, and so forth. For example, log information includes television viewing history, recorder programming information, date and time of the washing machine running, amount of laundry, date and time of the refrigerator door opening and closing, number of times of the refrigerator door opening and closing, and so forth, but is not restricted to these, and various types of information which can be acquired from the various types of devices may be included. The log information may be directly provided to the cloud server 4111 from the multiple electric appliances 101 themselves over the Internet. Alternatively, the log information may be temporarily collected from the electric appliances 101 to the home gateway 4102, and be provided from the home gateway 4102 to the cloud server 4111.

Next, the cloud server 4111 of the data center operator 4110 provides the collected log information to the service provider 4120 in a certain increment. The certain increment here may be an increment in which the data center operator 4110 can organize the collected information and provide to the service provider 4120, or may be in increments requested by the service provider 4120. Also, the log information has been described as being provided in certain increments, but the amount of information of the log information may change according to conditions, rather than being provided in certain increments. The log information is saved in the server 121 which the service provider 4120 has, as necessary (arrow 132 in FIG. 1A).

The service provider 4120 organizes the log information into information suitable for the service to be provided to the user, and provides to the user. The user to which the information is to be provided may be the user U410 who uses the multiple electric appliances 101, or may be an external user U420. An example of a way to provide information to the users U410 and U420 may be to directly provide information from the service provider 4120 to the users U410 and U420 (arrows 133 and 134 in FIG. 1A). Also, an example of a way to provide information to the user U410 may be to route the information to the user U410 through the cloud server 4111 of the data center operator 4110 again (arrows 135 and 136 in FIG. 1A). Alternatively, the cloud server 4111 of the data center operator 4110 may organize the log information into information suitable for the service to be provided to the user, and provide to the service provider 4120. Also, the user 410 may be different from the user U420 or may be the same.

First Embodiment

The following is a description of a method for a speech dialogue system to appropriately restrict users who can respond with regard to spoken instructions of multiple users, in a case where two or more users use the same device. Description will be made below in order regarding the configuration of the speech dialogue system, the hardware configuration of a voice input/output device, the hardware configuration of a device, the hardware configuration of a gateway, functional blocks of the cloud server, functional blocks of the gateway, functional blocks of the device functional blocks of the voice input/output device, and the flow of processing of restricting users by the speech dialogue system.

Thereafter, overall services provided by the speech dialogue system using a type 1 service (in-house data center cloud service), an overall image of service provided by the speech dialogue system according to a type 2 service (IaaS usage cloud service), an overall image of service provided by the speech dialogue system according to a type 3 service (PaaS usage cloud service), and an overall image of service provided by a speech dialogue system according to a type 4 service (SaaS usage cloud service), will be described in order.

First the configuration of the speech dialogue system according to a first embodiment will be described. FIG. 2 is a configuration diagram of the speech dialogue system according to the first embodiment. The speech dialogue system illustrated in FIG. 2 includes a voice input/output device 240, multiple electric appliances 101, a gateway 102, an information communication network 220, a cloud server 111, and a display terminal 260. The multiple electric appliances 101 include a television set 243, an air conditioner 244, and a refrigerator 245. Note however, that multiple electric appliances 101 are not restricted to the devices which are the television set 243, air conditioner 244, and the refrigerator 245, and any device may be included.

The voice input/output device 240 here (example of a voice input device) includes a sound collection unit which collects voice of a group 100, and a voice output unit which outputs voice to the group 100. The group 100 is a space where the voice input/output device 240 can provide information to the users by voice. An example of the group 100 is inside the house of the users 250 and 251. The voice input/output device 240, electric appliances 101, gateway 102, and display terminal 260 are installed in the group 100. The cloud server 111 is situated outside of the group 100.

The voice input/output device 240 recognizes the voices of the users 250 and 251, and provides voice information from the voice input/output device 240, and also controls the multiple electric appliance 101, in accordance with instructions from the users 250 and 251 by voice input. More specifically, the voice input/output device 240 displays contents, replies to user questions, and controls the electric appliances 101, following user instructions by voice input.

Also here, connection of the voice input/output device 240, the multiple electric appliances 101, and the gateway 102, can be performed using cables or wireless. Also, at least part of the voice input/output device 240, gateway 102, and electric appliances 101 may be integrated.

In the example of this speech dialogue system illustrated in FIG. 2, the two users 250 and 251 are within the group 100. Hereinafter, the users 250 and 251 may be collectively referred to as user 250.

The display terminal 260 has input functions of the user 250 instructing device control, and information output functions of providing the user 250 with information. The input functions of the display terminal 260 may be realized by a touch panel, or realized by a push button. The display terminal 260 may be a cellular phone, smart phone, or a tablet device.

The information communication network 220 may be the Internet, with various types of data being transmitted/received using communication protocols such as TCP/IP or the like.

Figure 3:
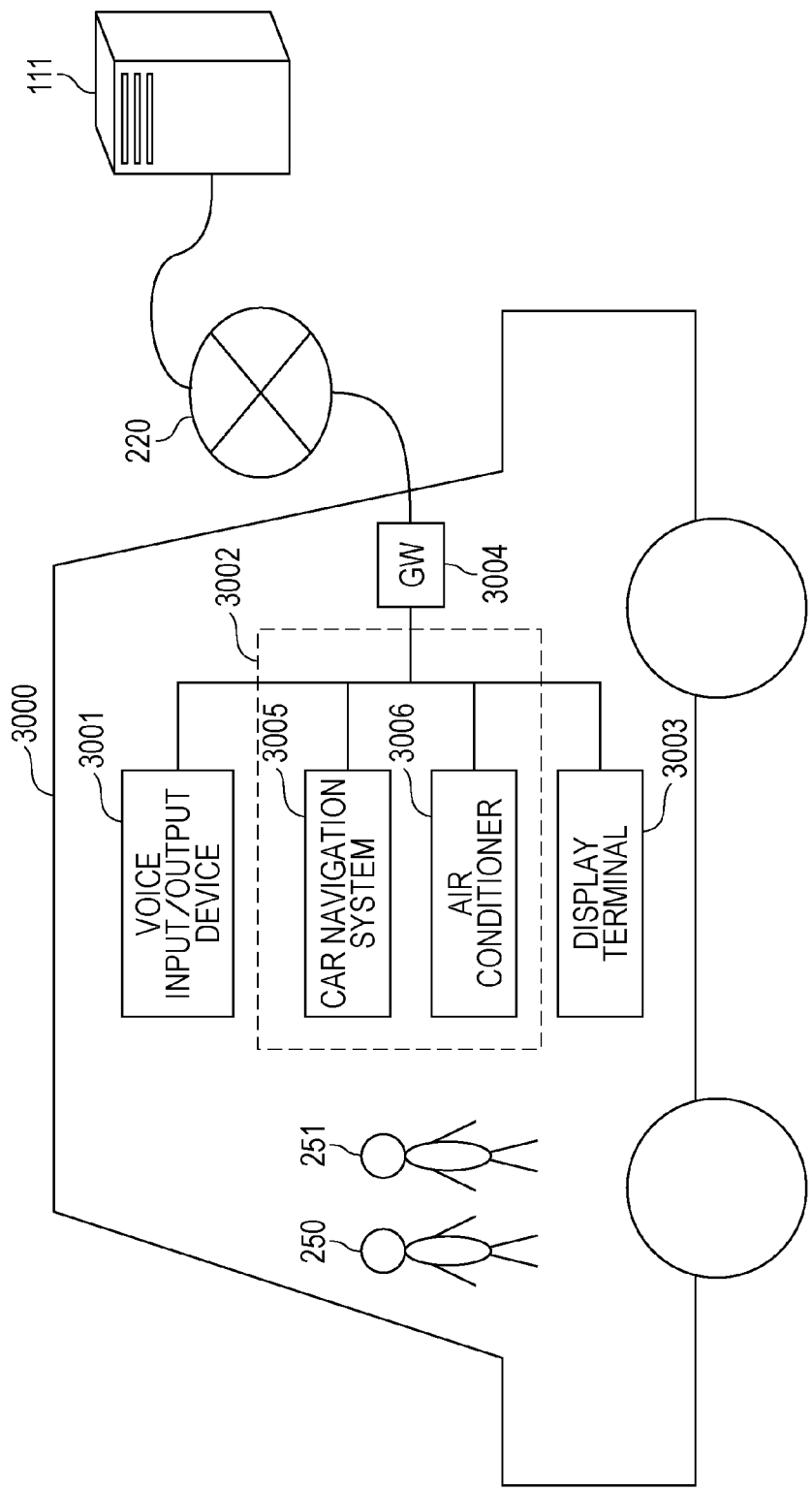
FIG. 3 is a configuration diagram of a modification of a speech dialogue system according to the first embodiment.

FIG. 3 is a configuration diagram of a modification of the speech dialogue system according to the first embodiment. In this modification, the speech dialogue system has been applied to an automobile 3000. The automobile 3000 is provided with a voice input/output device 3001, multiple onboard devices 3002, a display terminal 3003, and a gateway 3004. The voice input/output device 3001 is the same as the voice input/output device 240 in FIG. 2. The onboard devices 3002 are equivalent to the electric appliances 101 in FIG. 2, and are devices mounted in the automobile 3000. In the example in FIG. 3, the onboard devices 3002 include an automotive navigation system (hereinafter "navigation") 3005, and an air conditioner 3006.

The display terminal 3003 and the gateway 3004 are respectively equivalent to the display terminal 260 and the gateway 3004 illustrated in FIG. 2. The gateway 3004 is configured using a communication device which connects the onboard devices 3002 to a wireless local area network (LAN) access point, for example. The gateway 3004 connects the voice input/output device 3001, the onboard devices 3002, and the display terminal 3003 to the information communication network 220. The voice input/output device 3001, onboard devices 3002, and display terminal 3003 are connected to the gateway 3004 via an onboard LAN. The users 250 and 251 are on board the automobile 3000, and one of the users is the driver of the automobile 3000.

Figure 4:
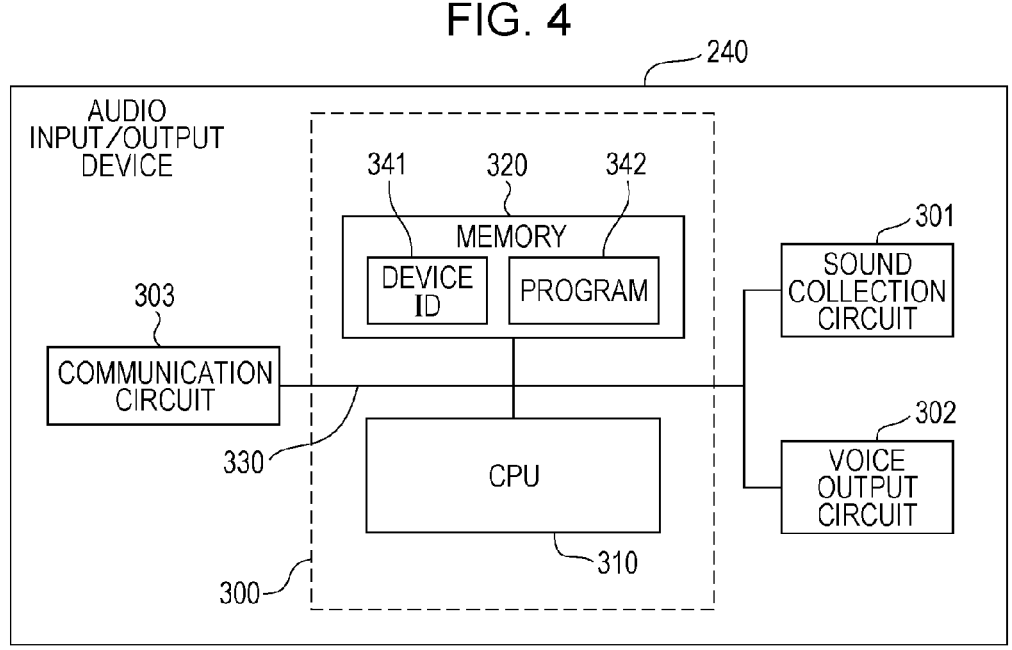
FIG. 4 is a diagram illustrating the hardware configuration of a voice input/output device according to the first embodiment.

Next, the hardware configuration of the voice input/output device 240 will be described. FIG. 4 is a diagram illustrating the hardware configuration of the voice input/output device 240. As illustrated in FIG. 4, the voice input/output device 240 has a processing circuit 300, a sound collection circuit 301, a voice output circuit 302, and a communication circuit 303. These blocks are mutually connected by a bus 330, and can exchange data and commands.

The processing circuit 300 is realized by a combination of a central processing unit (CPU) 310, and memory 320 storing a device identification (ID) 341 and computer program 342. Alternatively, this may be realized by dedicated hardware configured to realize the operations described below.

Note that the device ID 341 is an identifier uniquely assigned to the voice input/output device 240. The device ID 341 may be independently assigned by the manufacturer, or may be a physical address uniquely assigned on a network (a so-called Media Access Control (MAC) address) as a principle.

The sound collection circuit 301 collects user voice and generates analog voice signals, and converts the analog voice signals into digital voice data which is transmitted to the bus 330.

The voice output circuit 302 converts the voice data received over the bus 330 into analog voice signals, and outputs these analog voice signals.

The communication circuit 303 is a circuit for communicating with another device (e.g., the gateway 102) via a network. The communication circuit 303 performs communication conforming to the Ethernet (a registered trademark) standard, for example. The communication circuit 303 transmits log information and ID information generated by the processing circuit 300 to the gateway 102. The communication circuit 303 also transmits signals received from the gateway 102 to the processing circuit 300 via the bus 330.

The voice input/output device 240 may include, besides the components that are illustrated, components for realizing functions required of that device.

Figure 5:
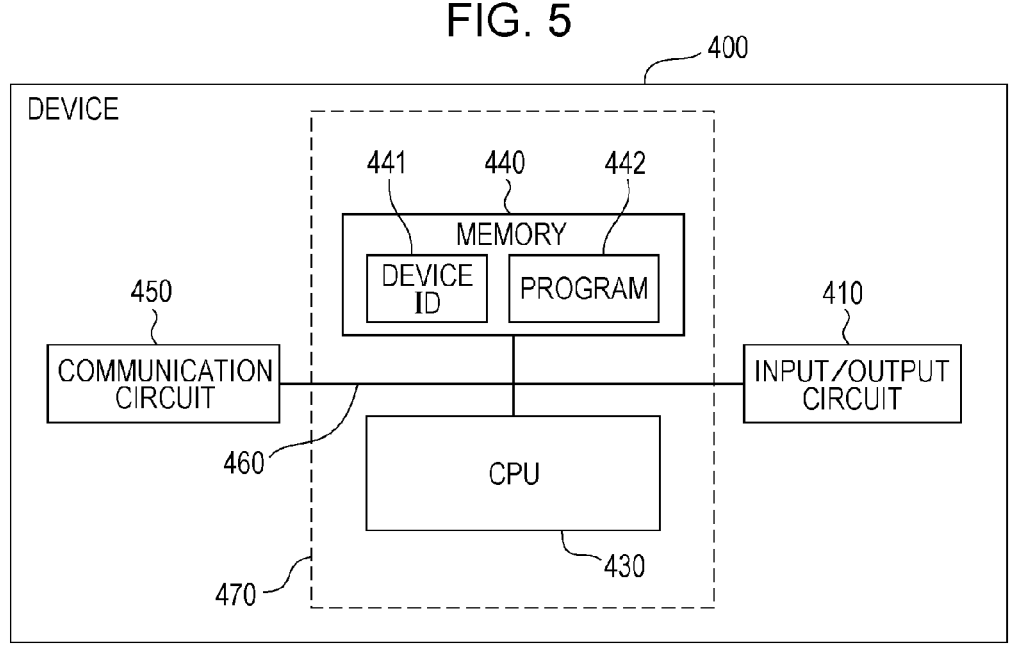
FIG. 5 is a diagram illustrating the hardware configuration of a device according to the first embodiment.

FIG. 5 is a diagram illustrating the hardware configuration of a device 400 which is an example of an electric appliance 101 according to the first embodiment and the onboard devices 3002. The television set 243, air conditioner 244, refrigerator 245, navigation 3005, and air conditioner 3006 are examples of the device 400.

The device 400 includes an input/output circuit 410, a communication circuit 450, and a processing circuit 470. These are mutually connected by a bus 460, and can exchange data and commands.

The processing circuit 470 is realized by a combination of a CPU 430, and memory 440 storing a device ID 441 and computer program 442. Alternatively, this may be realized by dedicated hardware configured to realize the operations described below.

Note that the device ID 441 is an identifier uniquely assigned to the device 400. The device ID 441 may be independently assigned by the manufacturer, or may be a physical address uniquely assigned on a network (a MAC address) as a principle.

The input/output circuit 410 outputs results processed by the processing circuit 470. The input/output circuit 410 also converts input analog signals into digital data and transmits to the bus 460.

The communication circuit 450 is a circuit for communicating with another device (e.g., the gateway 102) via a network. The communication circuit 450 performs communication conforming to the Ethernet (a registered trademark) standard, for example. The communication circuit 450 transmits log information and ID information generated by the processing circuit 470 to the gateway 102. The communication circuit 450 also transmits signals received from the gateway 102 to the processing circuit 470 via the bus 460.

The device 400 may include, besides the components that are illustrated, components for realizing functions required of that device.

Figure 6:
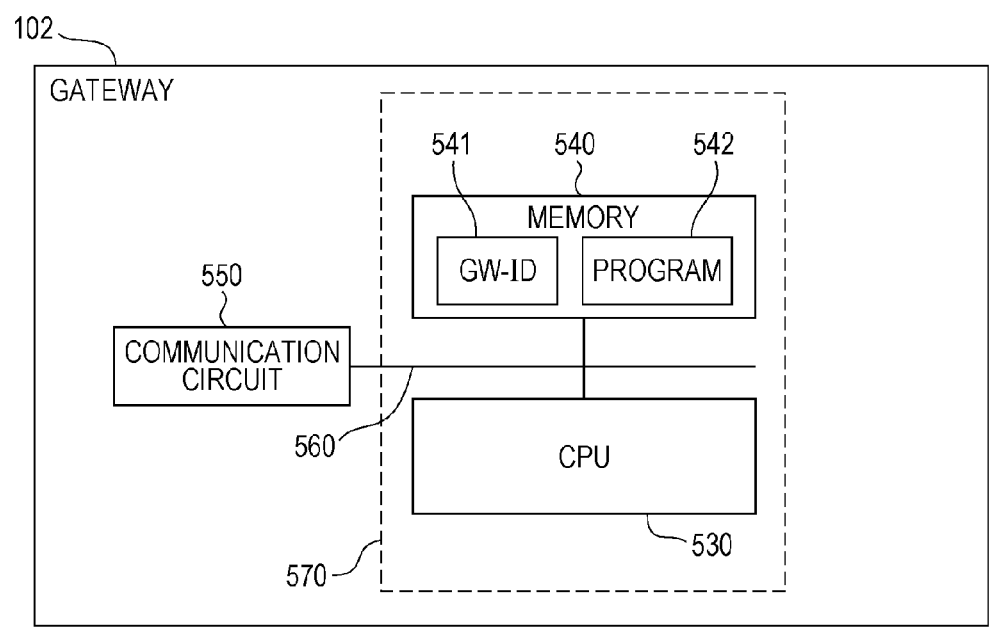
FIG. 6 is a diagram illustrating the hardware configuration of a gateway according to the first embodiment.

FIG. 6 is a diagram illustrating the hardware configuration of the gateway 102. The gateway 102 includes a communication circuit 550 and a processing circuit 570. These are mutually connected by a bus 560, and can exchange data and commands.

The communication circuit 550 is a circuit for communicating with another device (e.g., the voice input/output device 240) via a network. The communication circuit 550 performs communication conforming to the Ethernet (a registered trademark) standard, for example. The communication circuit 550 transmits log information and ID information generated by the processing circuit 570 to the voice input/output device 240, the device 400, and the display terminal 260. The communication circuit 550 also transmits signals received from the voice input/output device 240, device 400, and display terminal 260, to the processing circuit 570 via the bus 560.

The processing circuit 570 is realized by a combination of a CPU 530, and memory 520 storing a gateway ID 541 uniquely identifying a gateway 102 and computer program 542. Alternatively, this may be realized by dedicated hardware configured to realize the operations described below. The gateway 102 may include, besides the components that are illustrated, components for realizing functions required of that device.

FIG. 6 illustrates the gateway ID 541 stored in memory 540 where the computer program 542 is stored. However, this is but one example. An arrangement may be made where the computer program 542 is stored in RAM or ROM, and the gateway ID 541 is stored in flash memory.

Figure 7:
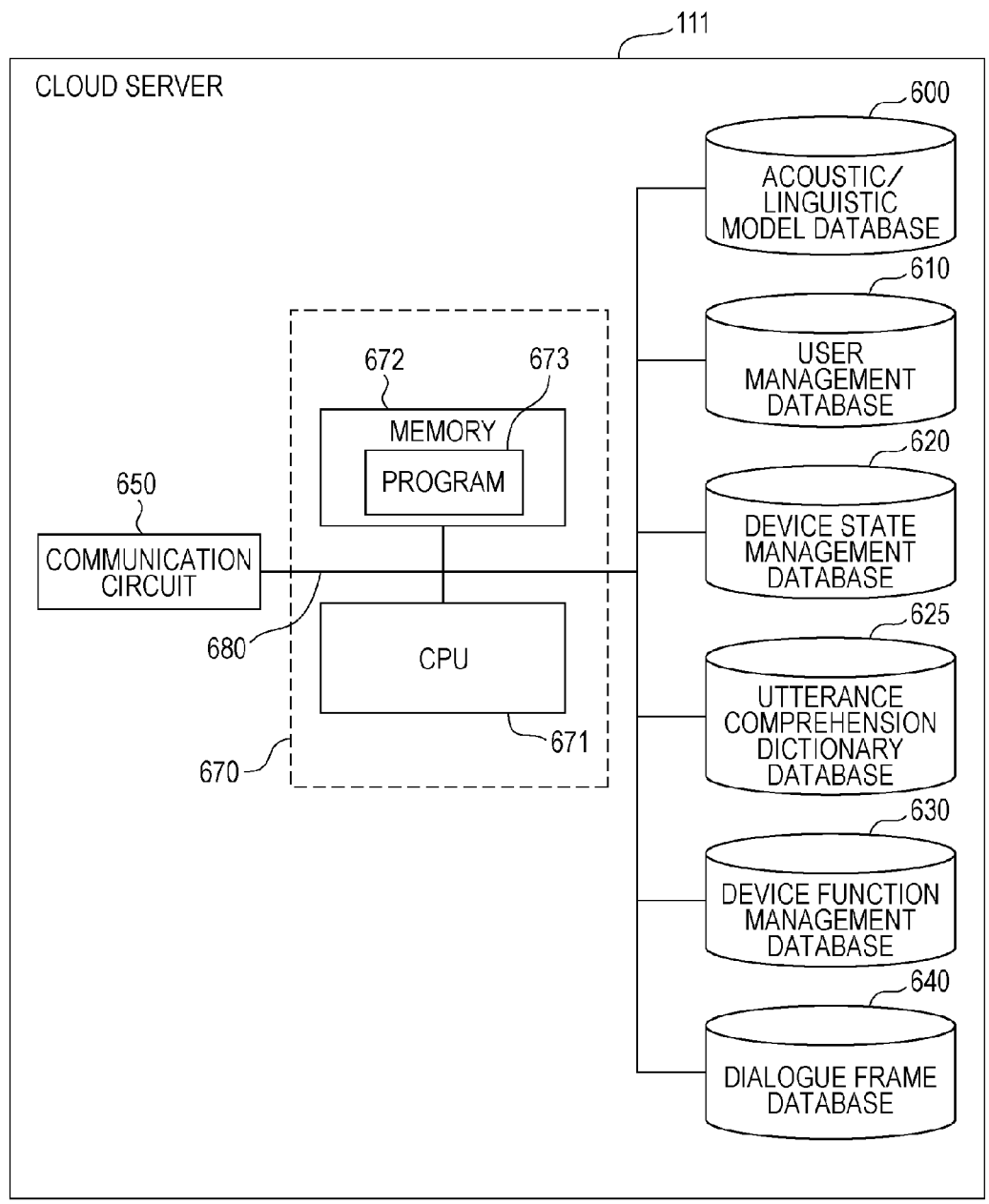
FIG. 7 is a diagram illustrating the hardware configuration of a cloud server according to the first embodiment.

FIG. 7 is a diagram illustrating the hardware configuration of the cloud server 111. The cloud server 111 includes a communication circuit 650, a processing circuit 670, an acoustic/linguistic model database 600, a user management database 610, a device state management database 620, an utterance comprehension dictionary database 625, a device function management database 630, and a dialogue frame database 640.

The processing circuit 670 includes a CPU 671 and memory 672 storing a computer program 673. These components are connected by a bus 680, and can mutually exchange data.

The processing circuit 670 is connected to the acoustic/linguistic model database 600, user management database 610, device state management database 620, utterance comprehension dictionary database 625, device function management database 630, and dialogue frame database 640 by the bus 680. The processing circuit 670 acquires and edits management information stored in these databases.

While the acoustic/linguistic model database 600, user management database 610, device state management database 620, utterance comprehension dictionary database 625, device function management database 630, and dialogue frame database 640 are internal elements of the cloud server 111 in the present embodiment, these may be provided outside of the cloud server 111. In such a case, the processing circuit 670 is connected to an externally-provided database via the Internet.

The communication circuit 650 is a circuit for communicating with another device (e.g., the gateway 102) via a network. The communication circuit 650 performs communication conforming to the Ethernet (a registered trademark) standard, for example.

The CPU 671 controls the operations of the cloud server 111. The CPU 671 executes commands described in the computer program 673 loaded to the memory 672. Accordingly, the CPU 671 can realize various functions. An instruction set is described in the computer program 673 for the cloud server 111 to realize the later-described operations.

The above-described computer program 673 may be recorded in a recording medium such as CD-ROM or the like and distributed to the market as a product, or may be transferred over an electric communication line such as the Internet or the like. A device having the hardware configuration illustrated in FIG. 7 (e.g., a PC) functions as the cloud server 111 according to the present embodiment by reading in this computer program 673.

Figure 8:
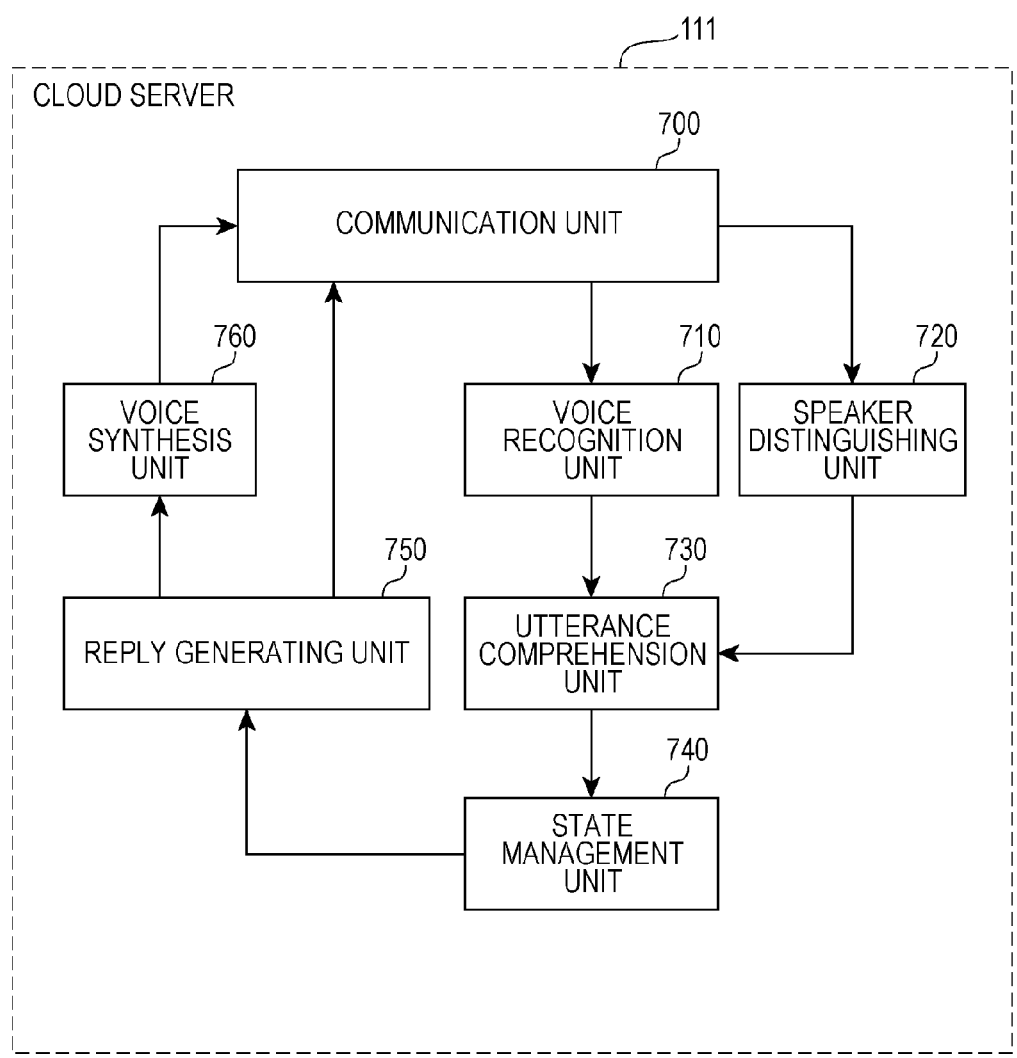
FIG. 8 is a diagram illustrating the system configuration of the cloud server according to the first embodiment.

FIG. 8 is a diagram illustrating the system configuration of the cloud server 111. The cloud server 111 includes a communication unit 700, a voice recognition unit 710, a speaker distinguishing unit 720, an utterance comprehension unit 730, a state management unit 740, a reply generating unit 750, and a voice synthesis unit 760.

The communication unit 700 corresponds to the communication circuit 650. The communication unit 700 performs communication with other devices (e.g., the gateway 102) via a network. The communication circuit 700 performs communication conforming to the Ethernet (a registered trademark) standard, for example.

The voice recognition unit 710 is realized by the processing circuit 670 and the acoustic/linguistic model database 600. The voice recognition unit 710 converts voice data into text string data. More specifically, the voice recognition unit 710 acquires, from the acoustic/linguistic model database 600, an acoustic model registered beforehand, and converts the voice data into phonemic data using the acoustic model and frequency characteristics of the voice data. The voice recognition unit 710 also acquires information regarding a linguistic model from the acoustic/linguistic model database 600 that has been registered beforehand, and generates particular text string data from the array of phonemic data, using the linguistic model.

The speaker distinguishing unit 720 is realized by the processing circuit 670 and the user management database 610. The speaker distinguishing unit 720 distinguishes between users present in the group 100. The speaker distinguishing unit 720 uses the voice data and recognizes voiceprints of users registered beforehand, and thus distinguishes between users in the group 100. Specifically, the speaker distinguishing unit 720 acquires voiceprint data of users registered beforehand from the user management database 610. The speaker distinguishing unit 720 also compares this voiceprint data with voiceprint data extracted from the voice data, thereby distinguishing users.

The utterance comprehension unit 730 is realized by the processing circuit 670 and the device function management database 630. The utterance comprehension unit 730 extracts contexts data from the text string data generated at the voice recognition unit 710. Context data is words (context) contained in the text string data, and is data regarding which words, that are necessary for causing the device 400 to execute tasks, have been listed. Specifically, the context data has, the "type" of word contained in the text string data, out of the words registered in the utterance comprehension dictionary database 625, and "concept" or "Task ID" described in a correlated manner. The utterance comprehension unit 730 extracts context data by matching the text string data to the device function management database 630.

The state management unit 740 is realized by the processing circuit 670 and the device state management database 620 and dialogue frame database 640. The state management unit 740 uses the context data input from the utterance comprehension unit 730 to update the data registered in the device state management database 620 and the dialogue frame database 640.

The reply generating unit 750 is realized by the processing circuit 670, the device state management database 620, and the dialogue frame database 640. The reply generating unit 750 matches the device state management database 620 updated by the state management unit 740, and the dialogue frame database 640, and generates control commands to control the device 400 to be controlled. The reply generating unit 750 also matches the device state management database 620 updated by the state management unit 740, and the dialogue frame database 640, and generates text string data for text information to be presented to the user.

The voice synthesis unit 760 is realized by the processing circuit 670 and the acoustic/linguistic model database 600. The voice synthesis unit 760 converts the text string data generated by the reply generating unit 750 into voice signals. Specifically, the voice synthesis unit 760 acquires an acoustic model and linguistic model that have been registered beforehand from the acoustic/linguistic model database 600, and converts the text string data generated by the reply generating unit 750 into particular voice signals.

Figure 9:
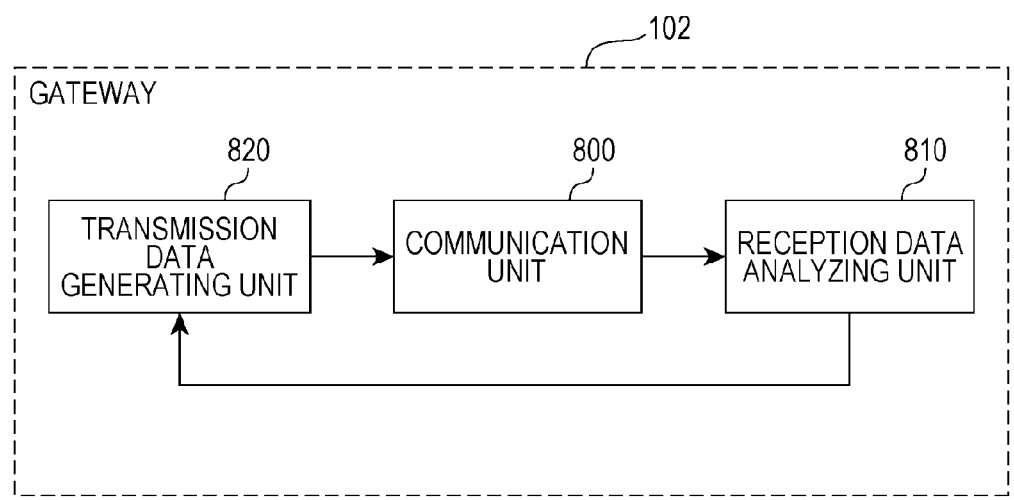
FIG. 9 is a diagram illustrating the system configuration of the gateway according to the first embodiment.

FIG. 9 is a diagram illustrating the system configuration of the gateway 102. The gateway 102 includes a communication unit 800, a reception data analyzing unit 810, and a transmission data generating unit 820.

The communication unit 800 corresponds to the communication circuit 550. The communication unit 800 performs communication with other devices (e.g., the voice input/output device 240) via a network. The communication unit 800 performs communication conforming to the Ethernet (a registered trademark) standard, for example. The communication unit 800 outputs the received data to the reception data analyzing unit 810. The communication unit 800 also transmits data generated by the transmission data generating unit 820 to the network.

The reception data analyzing unit 810 corresponds to the processing circuit 570. The reception data analyzing unit 810 analyzes the type of data which the communication unit 800 has received. The reception data analyzing unit 810 also decides, as a result of having analyzed the type of received data, the device to which transmission should be performed next (e.g., voice input/output device 240 or device 400), and the combination of data which should be transmitted to that device.

The transmission data generating unit 820 corresponds to the processing circuit 570. The transmission data generating unit 820 generates the transmission data from the device to which transmission should be performed next and the combination of data which should be transmitted to that device, decided by the reception data analyzing unit 810.

Figure 10:
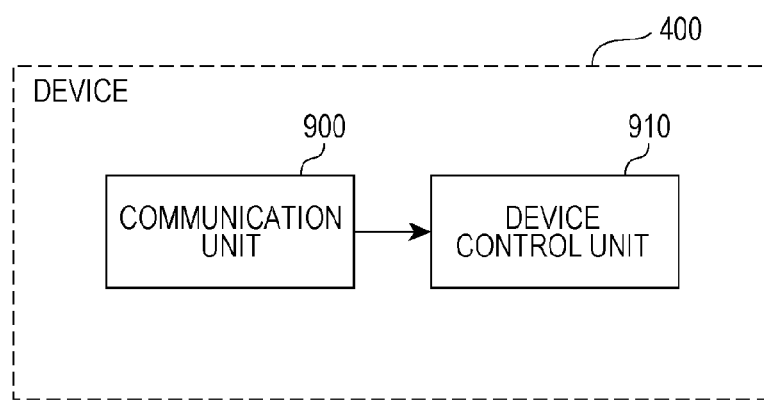
FIG. 10 is a diagram illustrating the system configuration of a device according to the first embodiment.

FIG. 10 is a diagram illustrating the system configuration of the device 400. The device 400 includes a communication unit 900 and a device control unit 910.

The communication unit 900 corresponds to the communication circuit 450. The communication unit 900 performs communication with another device (e.g., the gateway 102) via a network. The communication unit 900 performs communication conforming to the Ethernet (a registered trademark) standard, for example.

The device control unit 910 corresponds to the input/output circuit 410 and the processing circuit 470. In the device control unit 910, the processing circuit 470 reads in control data which the communication unit 900 has received, and the input/output circuit 410 which has performed the reading is controlled.

Figure 11:
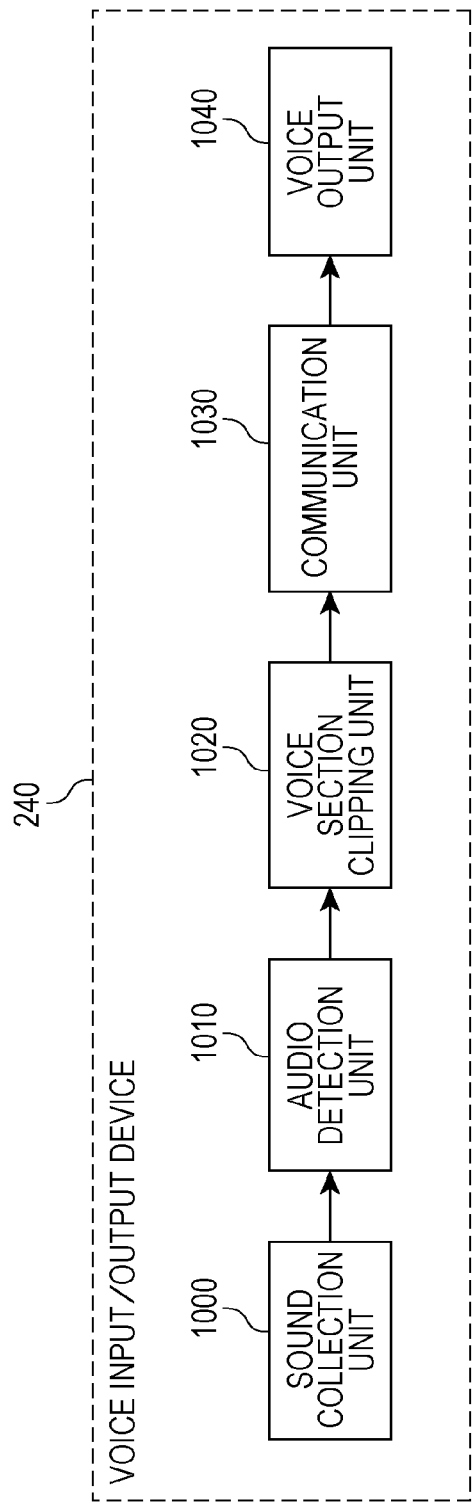
FIG. 11 is a diagram illustrating the system configuration of a voice input/output device according to the first embodiment.

FIG. 11 is a diagram illustrating the system configuration of the voice input/output device 240. The voice input/output device 240 includes a sound collection unit 1000, an audio detection unit 1010, a voice section clipping unit 1020, a communication unit 1030, and a voice output unit 1040.

The sound collection unit 1000 corresponds to the sound collection circuit 301. The sound collection unit 1000 collects sound from the user and generates analog audio signals, and also converts the analog audio signals into digital data and generates audio data.

The audio detection unit 1010 and the voice section clipping unit 1020 are realized by the processing circuit 300. The CPU 310 which executes the computer program 342 functions at one point as the audio detection unit 1010 for example, and at another point functions as the voice section clipping unit 1020. Note that at least one of these two components may be realized by hardware performing dedicated processing, such as digital signal processing (DSP) or the like.

The audio detection unit 1010 determines whether or not audio has been detected. For example, in a case where the level of audio generated at the sound collection unit 1000 (e.g., amplitude of voice signals) is at or below a predetermined level, the audio detection unit 1010 determines that audio has not been detected. The voice section clipping unit 1020 extracts a section from the acquired audio signals where there is voice.

The communication unit 1030 corresponds to the communication circuit 303. The communication unit 1030 performs communication with another device (e.g., the gateway 102) over a network. The communication unit 1030 performs communication conforming to the Ethernet (a registered trademark) standard, for example. The communication unit 1030 transmits voice signals of the section which the voice section clipping unit 1020 has extracted. The communication unit 1030 also hands the received voice signals to the voice output unit 1040.

The voice output unit 1040 corresponds to the voice output circuit 302. The voice output unit 1040 converts the voice signals which the communication unit 1030 has received into analog voice signals, and outputs the analog voice signals.

FIG. 12 is a diagram illustrating a specific example of the user management database 610. The user management database 610 has held therein, in a correlated manner, a "user ID" which is an identifier of a user, and a "voiceprint file" in which is recorded user voiceprint data, for example. The user management database 610 may also hold personal information of the user (e.g., user name, age, address) in a manner correlated with the "user ID".

FIG. 13 is a diagram illustrating a specific example of the device state management database 620. The device state management database 620 is a database where one record has been assigned for one device 400 to which the service of the speech dialogue system is applied, and is a database of the cloud server 111 to manage the current states of the devices 400. The device state management database 620 holds, for example, a "gateway ID (GW-ID)" which is an identifier of the gateway 102, "device ID", "type", "operating task ID", "dialogue state", and "task owner", in a mutually correlated manner.

The "gateway ID" is the identifier of the gateway 102. The "device ID" is the identifier of the device 400. The "type" indicates the type of the device 400, such as a television set, refrigerator, and air conditioner. The "operating task ID" is an identifier of a task currently being executed by the device 400. One task ID of the task IDs listed in "task ID" in FIG. 14 is registered in the "operating task ID".

The "dialogue state" indicates whether or not the device 400 currently is holding a dialogue with one certain user. In a case where the device 400 is holding a dialogue with a user, "awaiting input" is registered in the "dialogue state", and in a case where the device 400 is not holding a dialogue with a user, "neutral" is registered in the "dialogue state". The user ID holding dialogue with the device 400, i.e., one user ID which has authority for dialogue with the device 400, is registered in the "task owner". No user is currently holding a dialogue with a device 400 where the "dialogue state" is "neutral", so the "task owner" is left blank.

In the example in FIG. 13, the devices 400 of which the device IDs are "M01", "M02", and "M03" communicate with the cloud server 111 via the gateway 102 of which the "gateway ID" is "G001", so "G001" is correlated as the "gateway ID".

FIG. 14 is a diagram illustrating a specific example of the device function management database 630. The device function management database 630 is a database where one record is assigned to one task executed by a device 400 to which the service of the speech dialogue system is applied, in which for example, "device ID", "task ID", and "task description" are held in a correlated manner. The "device ID" is the same as that in FIG. 13. The "task ID" is an identifier of a task which the device 400 is capable of executing. The "task description" is a text briefly describing that the task is. The device 400 of which the "device ID" is "M01" is a television set, so tasks which the television executes, such as "change channels" and "change volume" are registered beforehand. The device 400 of which the "device ID" is "M02" is a refrigerator, so tasks which the refrigerator executes, such as "temperature settings" and "take inventory" are registered beforehand.

FIG. 15 is a diagram illustrating a specific example of the utterance comprehension dictionary database 625. The utterance comprehension dictionary database 625 is a database in which are registered beforehand words likely to be included in voice when voice is to be used to cause the device 400 to execute a task, and is a database where one record is assigned to one word.

The utterance comprehension dictionary database 625 has, for example "word ID", "word", "type", and "concept or TaskID" held in a mutually correlated manner. The "word ID" is an identifier for uniquely identifying a word. The "word" is the word itself. The "type" is the type of the word. In the example in FIG. 15, words representing places, such as "Hokkaido" and "Aomori" have <place> registered as "type". Also, words representing date and time, such as "today" and "tonight" have <date> registered as "type". Also, words which serve as keywords for tasks to be performed by the device 400, such as "news" and "weather", have <task> registered as "type".

A concept is registered in the "concept or TaskID" for words regarding which the "type" is <place> or <date>, and a task ID is registered for words regarding which the "type" is <task>. Now, "concept" is a logical symbol which uniquely represents the meaning of the word. The "task ID" is a task ID of the task which the word represents, and one of the task IDs listed in FIG. 14 is registered here. For example, in a case where the user utters a voice including "weather" to the device 400, such as "what is the weather for today", the probability that the user has spoken this voice for the television to obtain weather information is high. Accordingly, in the example in FIG. 15, the task of task ID "T01015" for the television to obtain weather information is correlated with the word "weather".

Also, if the user only says "today", determining the task from that voice is difficult. On the other hand, the voice "today" is a keyword in the above example of obtaining weather information, regarding obtaining weather information for when. Accordingly, words of which the types are <place> and <date> are correlated with concepts and not task IDs, and are handled as information necessary to execute tasks.

FIG. 16 is a diagram illustrating a specific example of the dialogue frame database 640. The dialogue frame database 640 is a database where conditions necessary for executing one certain task are registered. The dialogue frame database 640 has, for example, "device ID", "task ID", "type", "item importance", "concept", "execution when value is not input", and "execution when value is input" held in a mutually correlated manner. FIG. 16 illustrates an example of a task to have the television to obtain weather information to task ID "T0105". The "device ID" and "task ID" are the same as described above. The "type" is the same as the "type" illustrated in FIG. 15. The "item importance" indicates the degree of importance of the information registered in "type". If the information registered in "type" is required, "required" is registered in "item importance", and if the information registered in "type" is not required, "optional" is registered in "item importance".

A task for obtaining weather information necessitates obtaining information regarding when the weather information is to be for. Accordingly, "required" is registered as the "item importance" of the word of which the type is <date> in the example in FIG. 16, in order to make the word for when the weather information is to be obtained for required in the execution of the task to obtaining the weather information. On the other hand, the task for obtaining weather information does not necessarily require obtaining information regarding where the weather information is to be for, but this information would be helpful. Accordingly, "optional" is registered as the "item importance" of the word of which the type is <place> in the example in FIG. 16.

The "concept" is the same as the "concept" illustrated in FIG. 15. For example, in a case of causing the device 400 to execute a task using a word of which the "type" is <place>, the device 400 must be made to recognize specifically what place the word is indicating. In the example of the task of obtaining weather information, information regarding where the weather information is to be obtained for is necessary. Accordingly, in the example in FIG. 16, "Osaka" is registered as an example of the "concept" of the type <place>. Accordingly, the speech dialogue system can cause the device 400 to obtain weather information for "Osaka".

The "execution when value is not input" indicates the processing that is to be performed by the speech dialogue system, in a case where the word for the relevant "type" has not been input, to prompt the user to speak that word. A reply sentence "weather for when?" is registered for the "execution when value is not input" corresponding to "type" of <date> in the example in FIG. 16. Accordingly, if the user only says "weather", for example, the speech dialogue system has not recognized when the weather information should be obtained for, and accordingly notifies the user with voice or an image indicating the reply sentence of "weather for when?". Accordingly, the user can be made to recognize the need to speak a word having the type <date>.

Also, for the "execution when value is not input" corresponding to a "task ID" of "Default", a reply sentence of "which task do you want to perform?" is registered in the example in FIG. 16. Accordingly, in a case where the speech dialogue system has been able to recognize that the user has spoken, but has not been able to identify a task from that voice, the user is notified with voice or an image indicating the reply sentence of "which task do you want to perform?". Accordingly, the user can be made to recognize the need to speak a word having the type <task>.

The "execution when value is input" indicates the processing regarding the device 400 in a case where a word for this "type" has been input.

An example of "execution when value is input" corresponding to "type" of <date> is illustrated in FIG. 16 registered as "controlled device: television, process: obtain weather information of <date>, and display on television screen, reply: "displaying weather of <date>"".

Accordingly, in a case where "today" is spoken as the word for the "type" <date> for example, a control command is transmitted to the television to execute the task of "obtain weather information for today, and display it on the television screen". Also, voice or an image indicating the reply sentence of "displaying the weather for today" is output from the television.

An example of "execution when value is input" corresponding to "type" of <place> is illustrated in FIG. 16 as "controlled device: television, process: obtain weather information of at <place>, and display on television screen, reply: "displaying weather of <date> at <place>"".

Accordingly, in a case where "Osaka" is spoken as the word for the "type" <place>, and "today" is spoken as the word for the "type"<date>, for example, a control command is transmitted to the television to execute the task of "obtained weather information for today for Osaka, and display it on the television screen". Also, voice or an image indicating the reply sentence of "displaying the weather for Osaka for today" is output from the television.

Also, for the "execution when value is input" corresponding to a "device ID" and "task ID" of "Default", a reply sentence of "you cannot use this device" is registered in the example in FIG. 16. Accordingly, in a case where the voice of another user is recognized while the speech dialogue system is awaiting input of the voice of the user with which the speech dialogue system is carrying on the dialogue, the user is notified with voice or an image indicating the reply sentence of "you cannot use this device". Thus, this other user can recognize that his/her speech is invalid.

While the example in FIG. 16 has processing registered for the television which is a device 400 to obtain weather information, the present disclosure is not restricted to this, and processing relating to various types of tasks registered in the device function management database 630 illustrated in FIG. 14 are registered in the dialogue frame database 640. For example, in the task to "change channels" of the television set, a word to specify the channel is required. In this case, a "type" word representing a numeral is registered as <numeral> in the utterance comprehension dictionary database 625, for example. The task "change channels" may then be registered in the dialogue frame database 640 with a "type" word <numeral> as a "required" word.

Also, in temperature adjustment of a refrigerator, a numeral to indicate temperature is required, so a word with "type"<numeral> may be registered in the dialogue frame database 640 as a "required" word for the task of adjusting the temperature of the refrigerator.

Also, a form can be envisioned regarding temperature adjustment of an air conditioner, where control is performed to lower the set temperature of the air conditioner in response to speech of "I'm hot", and where control is performed to raise the set temperature of the air conditioner in response to speech of "I'm cold". In order to realize this, the words "hot" and "cold" are registered in the utterance comprehension dictionary database 625 as type <condition>, for example. Also, the concept of the word for "I'm hot" is registered in the utterance comprehension dictionary database 625 as "hot", and the concept of the word for "I'm cold" is registered as "cold". The word with "type <condition>" is then registered in the dialogue frame database 640 as a required word in air conditioner temperature setting processing. Also, "lower temperature of air conditioner by 1 degree" may be registered as the "execution when value is input" for "concept" of "hot", and "raise temperature of air conditioner by 1 degree" may be registered as the "execution when value is input" for "concept" of "cold".

Figure 19:
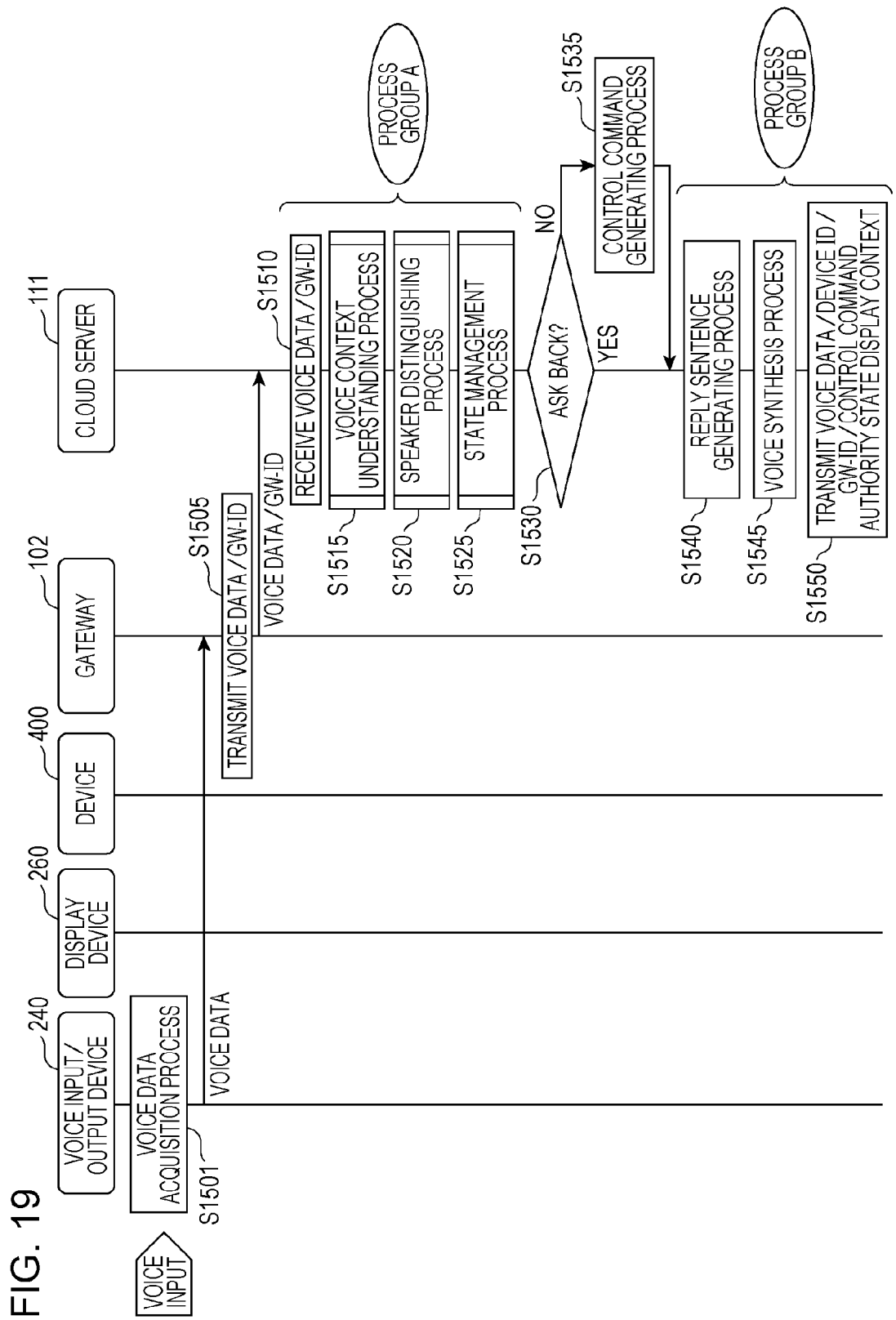
FIG. 19 is a sequence diagram of communication processing performing user restriction in the speech dialogue system according to the first embodiment.
Figure 20:
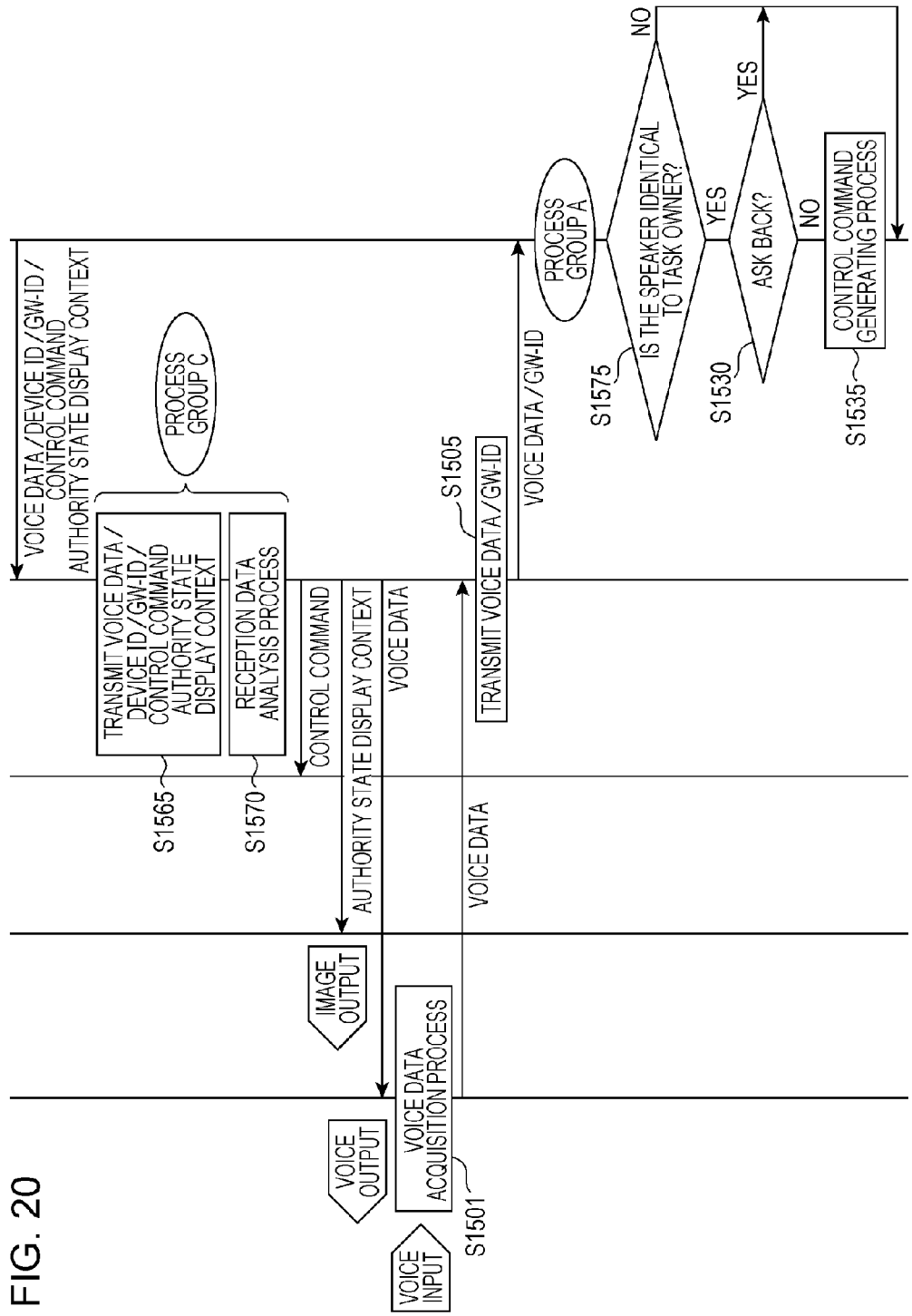
FIG. 20 is a sequence diagram of communication processing performing user restriction in the speech dialogue system according to the first embodiment.

FIGS. 19 through 21 are sequence diagrams of communication processing of the speech dialogue system to restrict users. This sequence is started when the user utters voice to instruct something to the device 400. Note that FIGS. 19 through 21 represent a series of sequences.

In S1501, the voice input/output device 240 performs A/D conversion of analogue voice signals representing voice which the user has uttered, and acquires as voice data. The communication circuit 303 of the voice input/output device 240 transmits the acquired voice data to the gateway 102. The gateway 102 receives the voice data. Here, the content of instruction which the user has uttered is one example of a first instruction content, and voice data indicating the first instruction content is one example of first instruction information.

In S1505, the gateway 102 transmits the gateway ID 541 held in its own memory 540 to the cloud server 111 along with the voice data received from the voice input/output device 240.

Figure 18A:
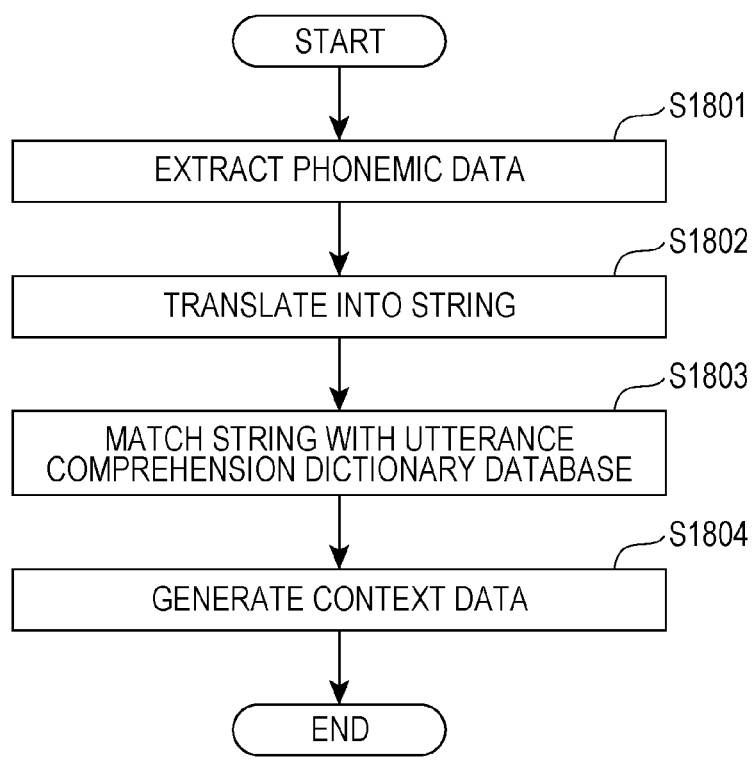
FIG. 18A is a flowchart illustrating details of speech content comprehension processing according to the first embodiment.

The cloud server 111 receives the voice data and the gateway ID 541 in S1510, and in S1515 performs voice context understanding processing. This voice context understanding processing is processing to recognize the voice of the user by the voice recognition unit 710 of the cloud server 111, and to extract context data by the utterance comprehension unit 730 of the cloud server 111. Specifically, the cloud server 111 executes voice context understanding processing using the acoustic/linguistic models registered in the acoustic/linguistic model database 600. FIG. 18A is a flowchart illustrating the details of the voice context understanding processing in S1515.

Upon the communication unit 700 receiving voice data of the user from the voice input/output device 240, the voice recognition unit 710 of the cloud server 111 extracts frequency characteristics from that voice data, and extracts phonemic data from an acoustic model held in the acoustic/linguistic model database 600 (S1801).

Next, the matches the array of extracted phonemic data to the closest text string data in the linguistic model held in the acoustic/linguistic model database 600, thereby converting the voice data into a particular text string data (S1802).

Next, the utterance comprehension unit 730 of the cloud server 111 matches the converted text string data and the utterance comprehension dictionary database 625 (S1803).

Next, the utterance comprehension unit 730 extracts all words which have completely or partially matched the text string data, and generates context data listing the "type" and "concept or Task ID" of all extracted words (S1804).

For example, assumption will be made that the user says "what is the weather for today?". In this case, context data where <date> which is the "type" of "today" and <today> which is the "concept" of "today" are correlated, and also <task> which is the "type" of "weather" and "T0105" which is the "Task ID" of "weather" are correlated, and listed, is generated.

Returning to FIG. 19, the speaker distinguishing unit 720 of the cloud server 111 performs speaker distinguishing processing in S1520. This speaker distinguishing processing is processing to distinguish the speaker from the voice data of the user. Specifically, the speaker distinguishing unit 720 extracts voiceprint data from the voice data of the user transmitted from the voice input/output device 240, and matches the extracted voice print data with the user management database 610, thereby distinguishing speakers.

FIG. 17 is a flowchart illustrating details of the speaker distinguishing processing shown in S1520. First, the speaker distinguishing unit 720 extracts voiceprint data from the voice data transmitted from the voice input/output device 240 (S1701). The voiceprint data extracted here is an example of the first voice information.

Next, the speaker distinguishing unit 720 matches the extracted voiceprint data with the voiceprint data recorded in all voiceprint files registered in the user management database 610 (S1702).

Next, if there is voiceprint data registered in the user management database 610 matching the voiceprint data that has been extracted (YES in S1703), the speaker distinguishing unit 720 outputs the user ID correlated with the voiceprint file recording the matched voiceprint data. Thus, the user who is the speaker is uniquely distinguished. If the extracted voiceprint data is determined to match the voiceprint data recorded in the voiceprint file "S01.dat" in the user management database 610 in FIG. 12, the user ID "P01" is output.

On the other hand, if there is no matching voiceprint data the (NO in S1703), the speaker distinguishing unit 720 determines whether or not the voice accepting state is neutral (S1705). In this case, if the "dialogue state" of all devices 400 correlated with the gateway ID transmitted along with the voice data is "neutral" at the device state management database 620, determination is made that the voice accepting state is neutral (YES in S1705), and the processing is advanced to S1706. On the other hand, if the voice accepting state is not neutral (NO in S1705), the processing ends. In this case, if the "dialogue state" of any one device 400 of all devices 400 correlated with the gateway ID of the gateway 102 of this user is "awaiting input" at the device state management database 620, determination is made that the voice accepting state is not neutral.

In S1706 the speaker distinguishing unit 720 assigns a new user ID to the extracted voiceprint data, and newly registers in the user management database 610. Thus, the voiceprint data of a new user is registered in the user management database 610.

Returning to FIG. 19, the state management unit 740 of the cloud server 111 performs state management processing in S1525. This state management processing is processing where the state management unit 740 updates the dialogue frame database 640 and device state management database 620, and manages the state of the devices 400.

Figure 18B:
FIG. 18B is a flowchart illustrating details of state management processing according to the first embodiment.

FIG. 18B is a flowchart illustrating the details of the state management processing shown in S1525 of FIG. 19. First, the state management unit 740 references the device state management database 620 and obtains the "dialogue state" of the devices 400 (S1811). In this case, the "dialogue state" of the devices 400 correlated with the gateway ID transmitted along with the voice data to be processed is obtained from the device state management database 620.

For example, if the gateway ID transmitted along with the voice data to be processed is "G001", the "dialogue state" of the devices 400 having "device ID" of "M01", "M02", and "M03" is obtained in the example in FIG. 13. In this case, the "dialogue state" of each of the television set, refrigerator, and air conditioner, is "awaiting input", "awaiting input", and "neutral".

Next, the state management unit 740 acquires context data generated by the utterance comprehension unit 730 (S1812).

Next, the state management unit 740 determines whether or not the context data includes "Task ID" (S1813). For example, an assumption will be made that the voice data to be processed is "what is the weather for today?". In this case, this voice data includes the word "weather" of which the "type" is <task>, and the context data includes "T0151T" which is the Task ID of "weather", so determination of YES is made in S1813. Also, in a case where the voice data to be processed is "today" and a word of which the "type" is <task> is not included, a determination of NO is made in S1813.

Next, the state management unit 740 matches the acquired context data against the dialogue frame database 640 (S1814).

Next, the state management unit 740 determines whether or not all contents required to execute the task has been amassed (S1815). For example, if the data to be processed is "what is the weather for today?", settings have been made in the dialogue frame database 640 that inclusion of a word of which the "type" is <date> is a required condition to execute the task of task ID "T0105" to obtain weather information. Now, the "type" of the word "today" contained in "what is the weather for today?" is <date>. Accordingly, the voice data "what is the weather for today?" includes the required conditions to execute the task for obtaining the weather information. Thus, a determination of YES is made in S1815.

On the other hand, if the voice data to be processed is "weather?", this voice data does not contain a word of which the "type" is <date>, so a determination of NO is made in S1815.

In S1816, the state management unit 740 references the dialogue frame database 640 and outputs a control command indicated by "execution when value is input". In the task of task ID "T0105" described above, "obtain weather information for <date>, and display it on the television screen" is registered for the "execution when value is input", so a control command to cause the weather information for today to be obtained is generated.

In S1817, the state management unit 740 references the dialogue frame database 640 and outputs a control command indicated by "execution when value is not input". For example, a case will be assumed where the voice data to be processed is "weather" and the task has been identified, but a determination of NO has been made in S1815 since all contexts required to execute that task have not been amassed. In this case, the reply sentence of "weather for when?" is registered for the "execution when value is not input" for the task of task ID "T0105", so a control command to output the reply sentence "weather for when?" is generated in S1817.

Also, a case will be assumed where a determination of NO has been made in S1813 since no word of which the "type" is <task> is contained in the voice data to be processed. In this case, in S1817 a control command to output a reply sentence "which task do you want to perform?" that is registered for "execution when value is not input" corresponding to "task ID" of "Default", i.e., a reply sentence to prompt the user to speak a word of which the "type" is <task> is generated.

In S1818, the state management unit 740 updates the device state management database 620. FIG. 18C is a flowchart illustrating a detailed updating process of the device state management database 620 shown in S1818 in FIG. 18B. First, the state management unit 740 determines whether or not a timeout has occurred (S1821). This timeout here means that, for example, the device 400 has output the reply sentence of "weather for when?" to prompt the user to speak a word of which the "type" is <date>, but a predetermined amount of time has elapsed from the point-in-time of output of the reply sentence. The predetermined amount of time here is an amount of time from which it can be deemed that the user has no intent to speak in response to the reply sentence. Also, in a case where the user has spoken for the first time to cause the device 400 to execute a task, the device 400 has not output the reply sentence, so no timeout occurs, and determination of NO is made in S1821.

Next, the state management unit 740 determines whether or not the network has been cut off (S1822). If the voice input/output device 240 happens to be cut off from the network at the point, the speech dialogue system cannot acquire the voice which the user has spoken. Accordingly, a case where the network between the voice input/output device 240 and the cloud server 111 is cut off is the network cutoff here.

If the network has not been cut off (NO in S1822), the state management unit 740 determines whether or not all contexts required to execute the task have been amassed. This processing is the same as that in S1815 in FIG. 18B.

In a case where all contexts have been amassed (YES in S1823), the state management unit 740 resets the "operating task ID" and "task owner" of the relevant device 400 in the device state management database 620, and updates the "dialogue state" for the relevant device 400 to "neutral". For example, if the user has spoken, "what is the weather for today?", the task, and the device 400 to execute that task (television set) can be identified, and also the required conditions to execute the task of obtaining the weather information have been amassed, so "none" is registered in the "operating task ID" for "television" in the device state management database 620, and the "task owner" is made to be blank.

On the other hand, in a case where not all contexts have been amassed (NO in S1823), the state management unit 740 updates the "operating task ID" and "task owner" of the relevant device 400 in the device state management database 620, and updates the "dialogue state" to "awaiting input" (S1825).

For example, if the user has spoken, "what is the weather?", the task, and the device 400 to execute that task can be identified, but the required conditions to execute the task of obtaining the weather information have not been amassed. Accordingly, the task ID "T0105" of that task is registered to the "operating task ID" for "television" in the device state management database 620, and the user ID "P01" of the speaker that has been identified by the speaker distinguishing processing is registered in the "task owner". Further, the "dialogue state" is updated to "awaiting input" for the "television" in the device state management database 620. Thus, information indicating whether or not the device 400 is executing the task, and the user ID of one user in dialogue with the device 400, are registered in the device state management database 620. Accordingly, the current state of the device 400 to which the speech dialogue service is to be applied, and the user currently having authority to speak to the device 400, can be identified. Accordingly, even in a case where voice data from a user who does not have authority to speak is recognized, the device 400 can be prevented from being controlled according to that voice data.

Note that the processing in S1824 is also executed in a case where a timeout occurs (YES in S1821) and a case where the network has been cut off (YES in S1822). Accordingly, a state where the "dialogue state" of a certain device 400 remains neglected in a state of "awaiting input" in the device state management database 620 can be prevented. Also, the "dialogue state" of a certain device 400 can be returned to "neutral" without having to relegate the job of inputting interruption of the task regarding the relevant device 400 to the user.

This ends the processing of S1525 in FIG. 19. Note that in the present embodiment, the processing of S1510 through S1525 will be referred to as "process group A" hereinafter.

The reply generating unit 750 of the cloud server 111 determines in S1530 whether or not an ask-back to the user will occur. Whether or not an ask-back to the user will occur can be determined by whether or not all "required" contexts have been amassed for the relevant task in the dialogue frame database 640. That is to say, in a case where the determination result of S1815 in FIG. 18B is YES, a determination of NO is made in S1530, and in a case where the determination result of S1815 in FIG. 18B is NO, a determination of YES is made in S1530.

In S1535, the reply generating unit 750 performs control command generating processing. This control command generating processing is processing to generate a control command for the device 400 to be controlled. Specifically, the reply generating unit 750 generates a control command by reading in the content registered in the "execution when value is input" for the relevant task in the dialogue frame database 640. For example, in the example of a task to obtaining the weather information for today, a control command is generated to cause the television set to obtain the weather information for today.

In S1540, the reply generating unit 750 performs reply sentence generating processing. This reply sentence generating processing is processing to generate a reply sentence to notify the user. Specifically, in a case where an ask-back is necessary, the reply generating unit 750 generates a reply sentence by reading out the reply sentence registered in the "execution when value is not input" for the relevant task in the dialogue frame database 640. On the other hand, in a case where an ask-back is unnecessary, the reply generating unit 750 generates a reply sentence by reading out the reply sentence registered in the "execution when value is input" for the relevant task in the dialogue frame database 640.

The voice synthesis unit 760 of the cloud server 111 performs voice synthesis processing in S1545. This voice synthesis processing is processing for converting the response sentence into voice data. Specifically, the voice synthesis unit 760 converts the text string data of the response sentence into voice data using information of a acoustic/linguistic model that is registered in the acoustic/linguistic model database 600.

In S1550, the voice synthesis unit 760 transmits the generated control command and voice data of the reply sentence, and authority state display content including the text of the reply sentence, to the gateway 102 along with the device ID 441 of the device 400 to be controlled and the gateway ID 541.

Note that in the present embodiment, the processing of S1540 through S1550 will be referred to as "process group B" hereinafter.

In S1565, the gateway 102 receives the control command, voice data, authority state display content, device ID 441, and gateway ID 541, that have been transmitted from the cloud server 111. Next, in S1570 the gateway 102 performs reception data analysis processing. This reception data analysis processing is processing of separating the data which the reception data analyzing unit 810 of the gateway 102 has received into the control command, voice data, authority state display content, device ID 441, and gateway ID 541, the transmission data generating unit 820 of the gateway 102 transmitting the separated control command to the device 400 having the device ID 441, the separated voice data to the voice input/output device 240, and the separated authority state display content to the display terminal 260.

For example, if the reply sentence is "weather for when?" the voice input/output device 240 outputs the voice "weather for when?", and the display terminal 260 displays the authority state display content including the text "weather for when?".

On the other hand, in a case where a task is to be executed at the device 400, a control command for execution of that task is transmitted to the device 400, and the task is executed at that device 400. For example, if the control command is for causing the television set to perform the task of obtaining the weather information for today, that control command is transmitted to the television, and the television set obtains the weather information for today. The weather information for today is then displayed on the television.

Note that in the present embodiment, the processing of S1565 through S1570 will be referred to as "process group C" hereinafter.

Description will be made below regarding processing of S1501 and thereafter in FIG. 20, where the user finds from the reply sentence output by the voice input/output device 240 that an ask-back has occurred, and provides the voice input/output device 240 with a further instruction by voice.

The voice input/output device 240 acquires the voice data of the user. The communication circuit 303 of the voice input/output device 240 transmits the acquired voice data to the gateway 102, thereby repeating S1501. The gateway 102 receives that voice data. Here, the content of the instruction which the user has uttered is one example of a second instruction content, and voice data indicating the second instruction content is one example of second instruction information.

The gateway 102 transmits the gateway ID 541 held in its own memory 540 to the cloud server 111 along with the voice data received from the voice input/output device 240, thereby repeating S1505.

The cloud server 111 repeatedly executes the process group A. In S1575, the cloud server 111 determines whether the user which has spoken is the same as the task owner of the device 400 to be controlled. Specifically, the cloud server 111 extracts voiceprint data from the voice data to be processed (example of second voice information), matches the extracted voiceprint data with the user management database 610, and identifies the user who has spoken. The cloud server 111 then determines that the identified user is the task owner if the user ID of the identified user is the same as the user ID registered in the device state management database 620 as the "task owner" of the device 400 to be controlled.

For example, if the user ID of the identified user is "P01", "P01" is registered as the "task owner" of the "television" in the example of the device state management database 620 in FIG. 13. Accordingly, the identified user is determined to be the task owner of the "television", and in S1575 a determination of YES is made. On the other hand, if the user ID of the identified user is "P03", this user ID is not registered as the "task owner" of any device 400 of which the "dialogue state" is "awaiting input" in the example of the device state management database 620 in FIG. 13. Accordingly, the identified user is determined not to be the task owner, and in S1575 a determination of NO is made.

The cloud server 111 repeatedly executes S1530. Only in a case where the task owner is the same as the user who has spoken (YES in S1575) and determination is made that there is no need for an ask-back (NO in S1530), does the cloud server 111 perform the control command generating processing in S1535.

On the other hand, in a case where the task owner is the same as the user who has spoken (YES in S1575) and determination is made that there is need for an ask-back (YES in S1530), the cloud server 111 does not execute the control command generating processing in S1535 but executes the process group B again (FIG. 21). That is to say, in a case where the task owner and the user who has spoken are not the same, the cloud server 111 does not accept the instructions of the user who has spoken.

Next, the gateway 102 executes the process group C again, transmits a control command to the device 400, transmits voice data to the voice input/output device 240, and transmits authority state display content to the display terminal 260.

Figure 22A:
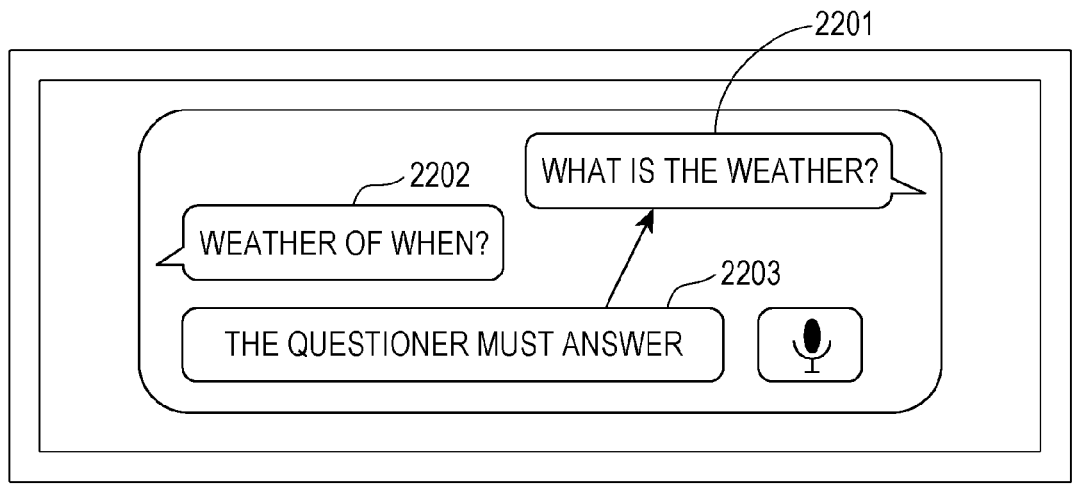
FIG. 22A is a screen diagram illustrating authority state display content.
Figure 22B:
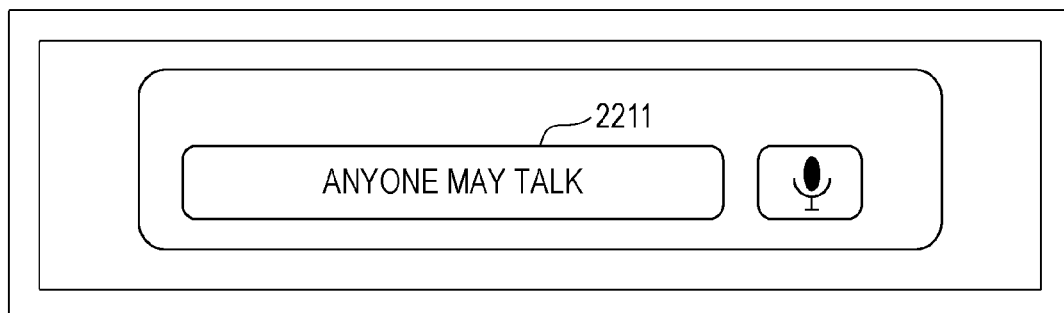
FIG. 22B is a screen diagram illustrating authority state display content.
Figure 22C:
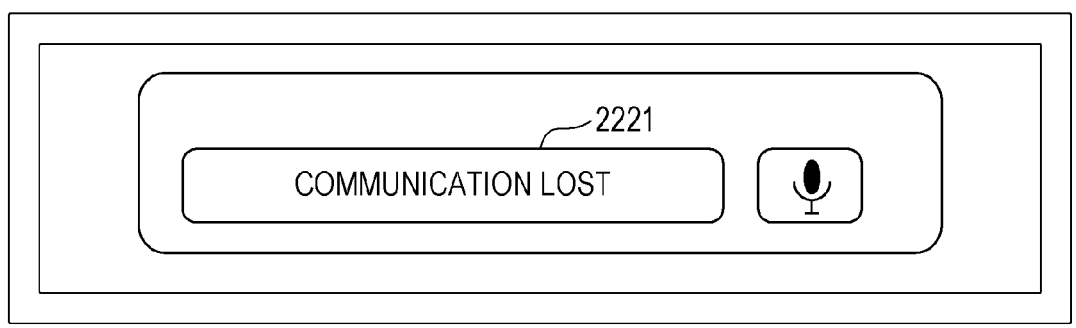
FIG. 22C is a screen diagram illustrating authority state display content.

FIGS. 22A through 22C are screen diagrams illustrating authority state display contents. FIG. 22A illustrates an authority state display content displayed on the display terminal 260 in a case where the user has uttered "what is the weather?", and the task has been identified but context required to execute the task has not been amassed. Note that the screen diagram in FIG. 22A is an example of a notification to the effect that input of the speech information cannot be accepted.

In this screen diagram, a text 2201 "what is the weather?", which is the content that the user has spoken earlier, is displayed. Also, at the current stage, the task of obtaining weather information has been identified from the "what is the weather?", but context required to execute the task has not been amassed, so text 2202 "weather of when?" is displayed to prompt the user to speak that context. Also, this task will be executed in the speech dialogue system under the condition that the same user as the user who spoke earlier speaks, so text 2203 "the questioner must answer" is displayed correlated with the text 2201 "what is the weather?". Thus, the user who is holding the dialogue can recognize that only he/she has the authority to control the device 400.

FIG. 22B illustrates an authority state display content displayed on the display terminal 260 in a case where all devices 400 to be controlled are in a neutral state. No user is a task owner in this state, so speech by any user is accepted by the speech dialogue system. Accordingly, this screen diagram illustrates that text 2211 "anyone can talk" displayed. Thus, the user can recognize that his/her speech will be accepted by the speech dialogue system.

FIG. 22C illustrates an authority state display content displayed on the display terminal 260 in a case where the network has been cut off. For example, if the network has been cut off in a state where there is a user with whom dialogue is being carried out, no matter how much the user may talk, the speech dialogue system cannot accept that speech. There is a problem that unless the user is notified of the network cutoff, the user will be made to speak unnecessarily. Accordingly, this display screen displays text 2221 "communication lost". Accordingly, the user can be made to recognize the network cutoff, and also recognize that any speech made now will not be accepted by the speech dialogue system.

Note that the authority state display content in FIG. 22A is displayed in a case where determination is made in S1503 that an ask-back is necessary and the process group C has been executed. The authority state display content in FIG. 22B is displayed in a case where all of the devices 400 to be controlled are in a neutral state, and the speech dialogue system is in a state awaiting voice from the user. Also, the authority state display content in FIG. 22C is displayed in a case where communication between the display terminal 260 and the cloud server 111 has been lost.

While the speech dialogue system according to the present embodiment has been described as being applied to a case where the user utter voice to control the devices 400, but the present disclosure is not restricted to this. For example, the speech dialogue system may be applied to a case where the user utters a keywords and the speech dialogue system performs a keyword search. Also, in a case where the speech dialogue system performs an ask-back to the user in order to confirm a keyword which the user has spoken, the user who can answer the ask-back from the speech dialogue system is restricted to the user who initially instructed the keyword search.

Another form of the above search is, for example, a form where the navigation 3005 illustrated in FIG. 3 is made to search a route to a destination. Assumption will be made that the user 250 of the speech dialogue system utters the voice "search" to the navigation 3005, and this voice is collected by the voice input/output device 3001. In this case, voice data of this voice is transmitted to the cloud server 111, and the cloud server 111 identifies the user who has uttered this voice, and also determines whether or not all contexts required to execute this search task have been amassed. An assumption will be made that a context of which the "type" is <place> is required for the navigation 3005 to execute the task of searching a route.

Now, since the only utterance has been "search", the cloud server 111 determines that the contexts for executing this task have not been amassed, and outputs a reply sentence "where is the destination?" to the voice input/output device 3001. Assumption will be made that the user 250 utters the voice "Osaka" in response to this reply sentence, for example. The voice data of this voice is then transmitted to the cloud server 111 and the cloud server 111 determines whether or not the user who has uttered this voice data is the same as the user 250 who made the initial utterance. Since these are the same here, the cloud server 111 causes the navigation 3005 to execute the task. Thus, the navigation 3005 searches a route from the current location to Osaka, and presents the search result to the user.

On the other hand, assumption will be made that the user 251 utters the voice "Osaka" in response to the reply sentence "where is the destination?". In this case, the user 251 who has spoken is not the same as the user 251 who has uttered the voice "search", so the task is not executed. Accordingly, a situation where the task is executed against the intent of the user 250 can be prevented.

Second Embodiment

Figure 23:
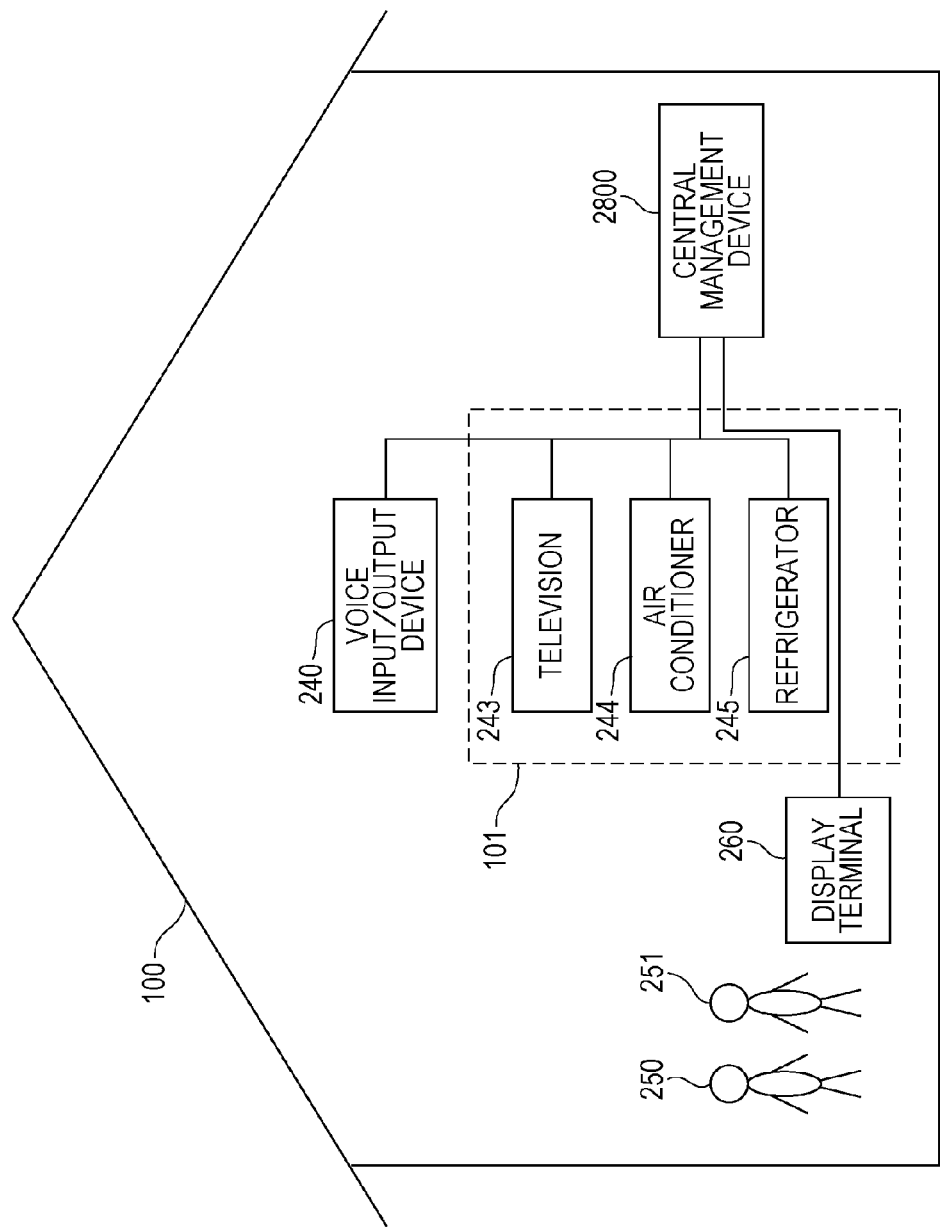
FIG. 23 is a configuration diagram of a speech dialogue system according to a second embodiment.

FIG. 23 is a diagram illustrating the configuration of a speech dialogue system according to a second embodiment. Components which are the same as those in the first embodiment are denoted with the same reference numerals in the second embodiment, and detailed description will be omitted. The following is a description of the second embodiment, primarily with regard to points which differ from the first embodiment.

The speech dialogue system according to the second embodiment includes the voice input/output device 240, multiple electric appliances 101, the display terminal 260, and a central management device 2800. That is to say, the speech dialogue system according to the second embodiment has the central management device 2800 instead of the gateway 102, information communication network 220, and cloud server 111 which the speech dialogue system according to the first embodiment has.

The central management device 2800 is installed within the group 100. A home server for managing devices 400 installed within the group 100 may be used as the central management device 2800. Connection among the central management device 2800, the display terminal 260, the voice input/output device 240, and the multiple electric appliances 101, may be performed by cable or wirelessly. The hardware configuration and system configuration of the central management device 2800 is the same as that of the cloud server 111.

While the central management device 2800 is illustrated as being separate from the electric appliances 101 in the second embodiment, the present disclosure is not restricted to this. For example, the television set 243, the air conditioner 244, or the refrigerator 245 may include the central management device 2800.

Figure 24:
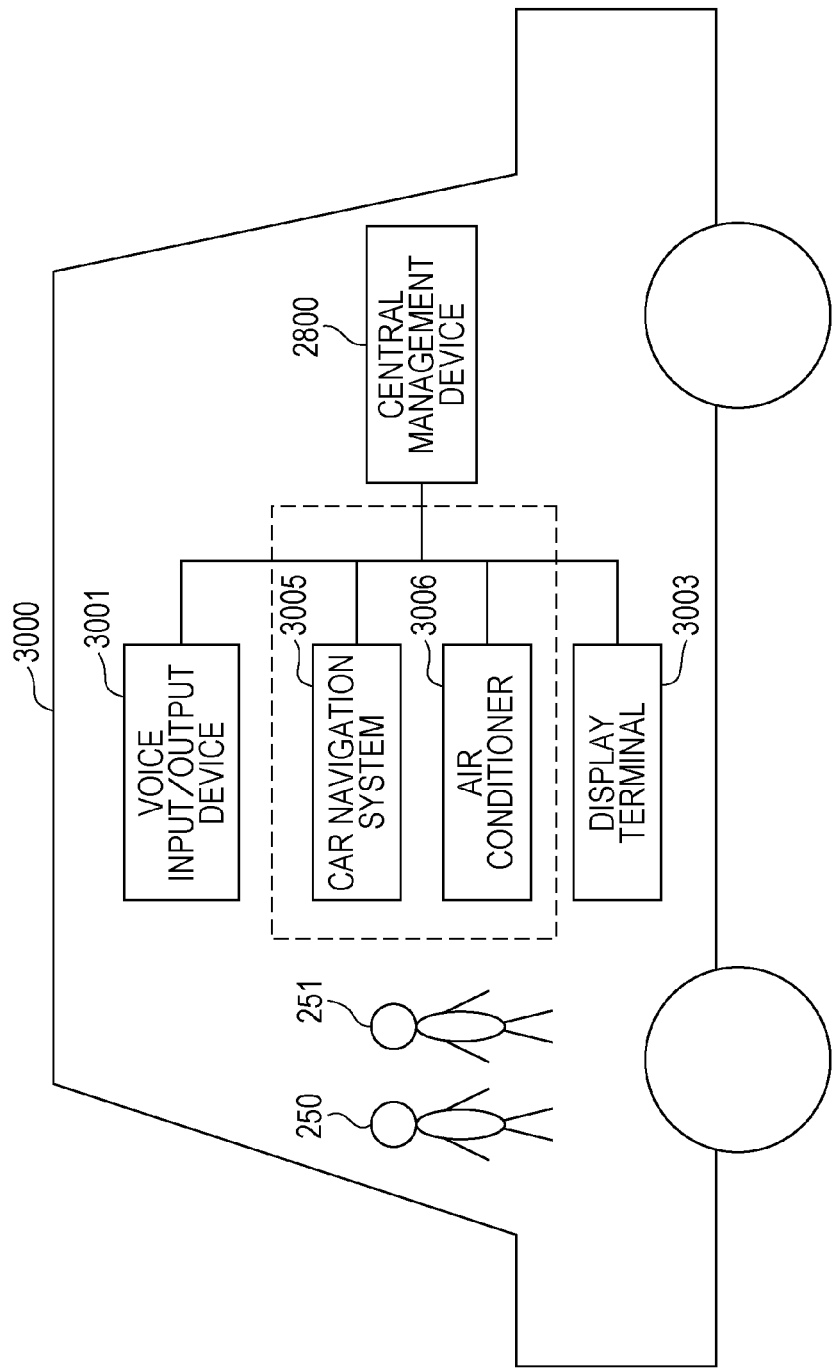
FIG. 24 is a configuration diagram of a modification of the speech dialogue system according to the second embodiment.

FIG. 24 is a configuration diagram of a modification of the speech dialogue system according to the second embodiment. The speech dialogue system illustrated in FIG. 24 has been applied to an automobile 3000, the same as the speech dialogue system illustrated in FIG. 3. The speech dialogue system illustrated in FIG. 24 differs from the speech dialogue system illustrated in FIG. 3 with regard to the point that the central management device 2800 has been provided instead of the gateway 3004 and the cloud server 111. The central management device 2800 here is mounted in the automobile 3000 and functions as the cloud server 111. Accordingly, the gateway 102 is omitted from the speech dialogue system in FIG. 24. Other than that, this is the same as the speech dialogue system in FIG. 3.

Figure 25:
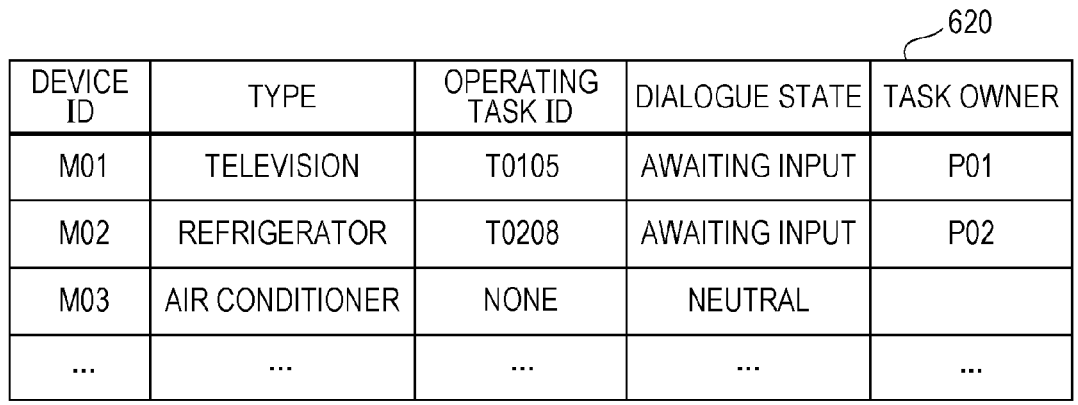
FIG. 25 is a diagram illustrating a specific example of a device state management database according to the second embodiment.

FIG. 25 is a diagram illustrating a specific example of the device state management database 620 according to the second embodiment. The gateway 102 has been omitted from the second embodiment. Accordingly, the "gateway ID" which had been provided to the device state management database 620 in FIG. 13 is omitted from the device state management database 620 illustrated in FIG. 25. Other than that, the device state management database 620 illustrated in FIG. 25 is the same as the device state management database 620 illustrated in FIG. 13.

Note that in the first embodiment, the cloud server 111 manages not the one group 100 to which the speech dialogue service is applied, but rather the devices 400 installed in all groups 100. Accordingly, there was the need to provide a gateway ID for the devices 400 and identify devices 400 installed in the same group 100 as that of the user who has spoken as the devices 400 to be controlled. Thus, the device state management database 620 illustrated in FIG. 13 had gateway IDs registered correlated with the device IDs.

On the other hand, the second embodiment assumes the central management device 2800 to be a home server installed in the group 100 of the user, so devices 400 installed in other groups 100 are not subject to being managed. Accordingly, the devices 400 of the group 100 where the central management device 2800 is installed are registered in the device state management database 620 illustrated in FIG. 25.

Figure 26A:
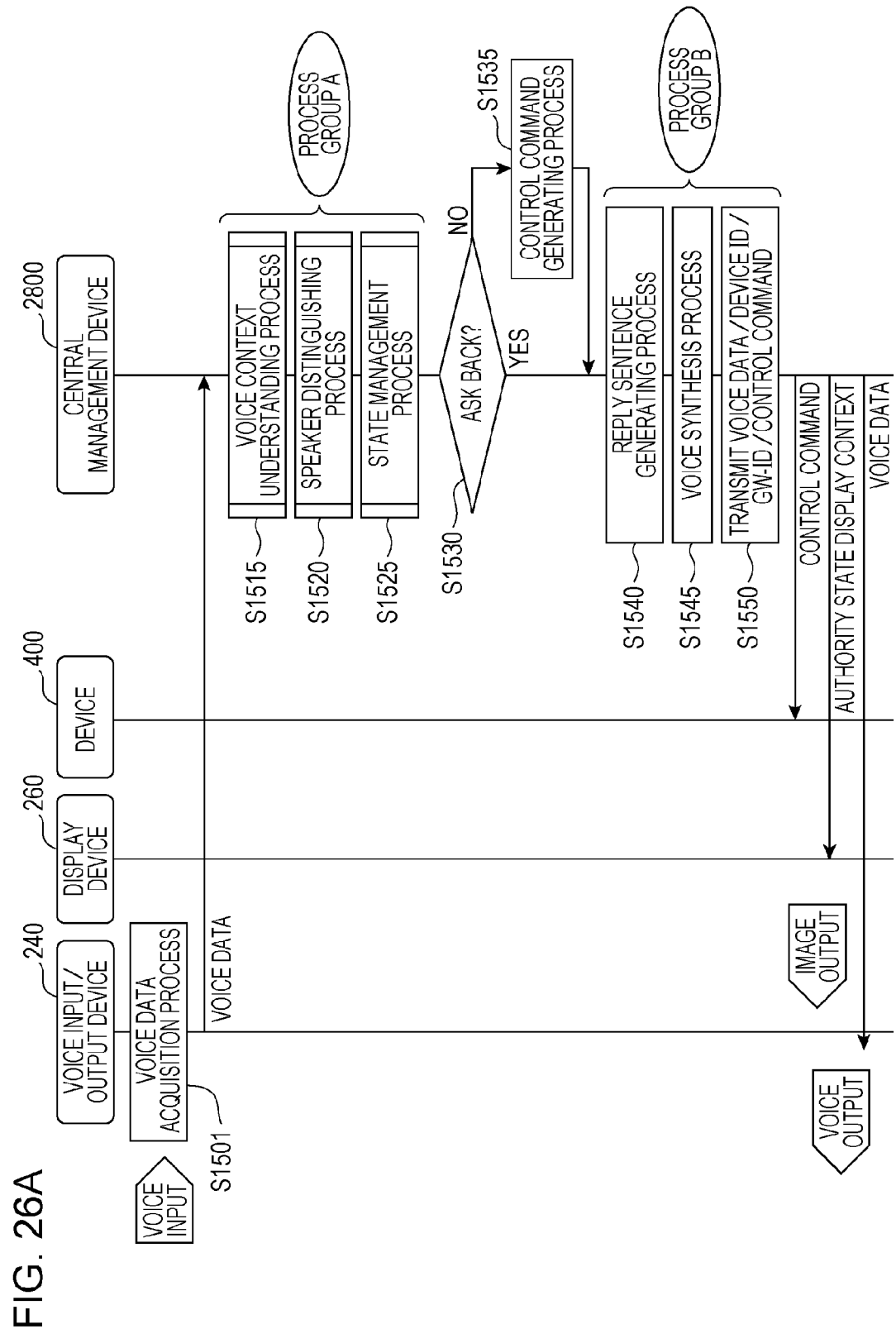
FIG. 26A is a sequence diagram of communication processing performing user restriction in the speech dialogue system according to the second embodiment.
Figure 26B:
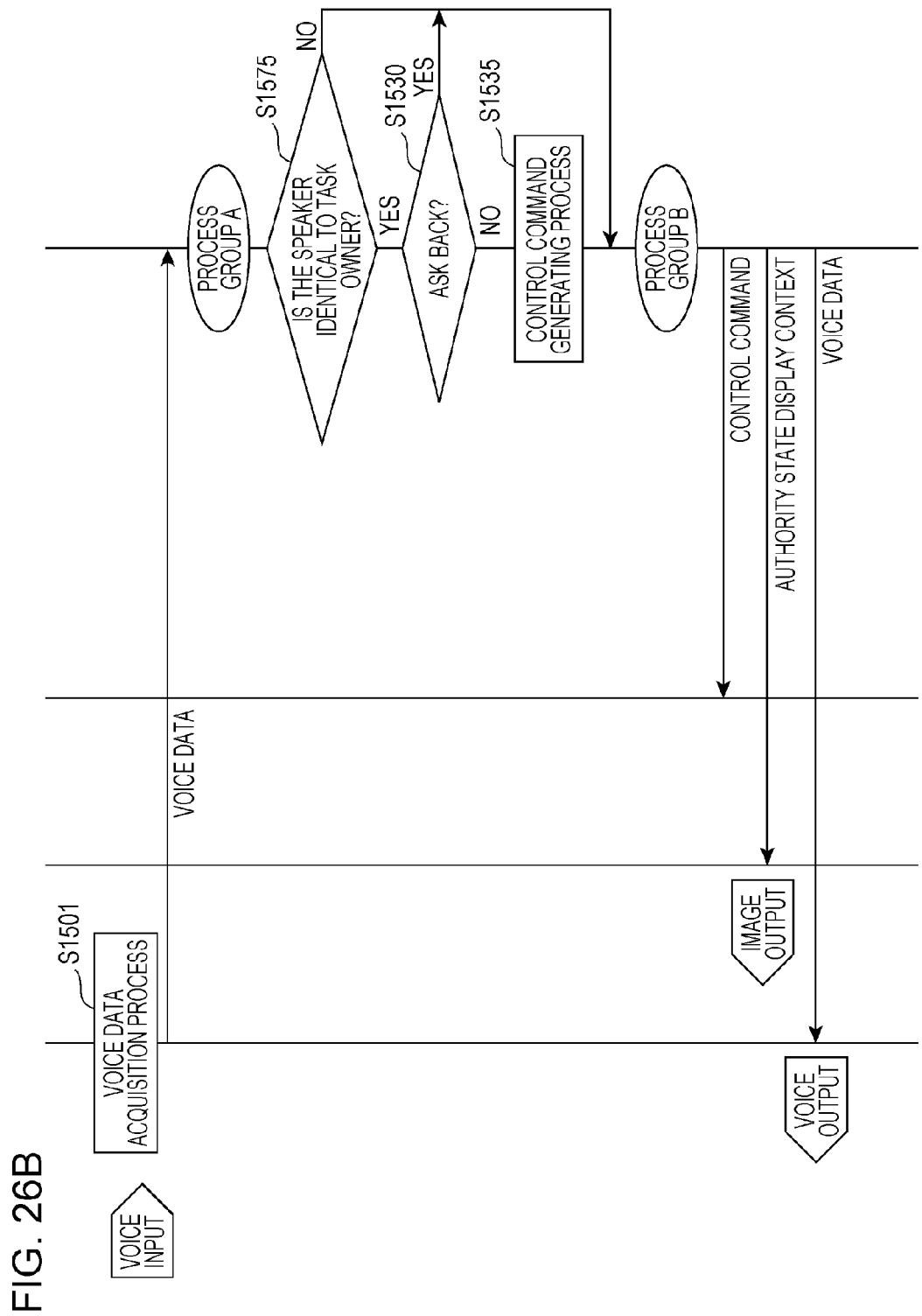
FIG. 26B is a sequence diagram of communication processing performing user restriction in the speech dialogue system according to the second embodiment.

FIGS. 26A and 26B are sequence diagrams of communication processing for restricting users according to the speech dialogue system of the second embodiment. In FIGS. 26A and 26B, the same symbols denote the same operations as those of the speech dialogue system according to the first embodiment, illustrated in FIGS. 19 through 21.

Processing which had been executed by the cloud server 111 in the first embodiment (FIGS. 19 through 21), is executed by the central management device 2800 in the second embodiment (FIGS. 26A and 26B). Accordingly, the transmission/reception processing between the cloud server 111 and the gateway 102 which was performed in the first embodiment (FIGS. 19 through 21) has been omitted from the second embodiment (FIGS. 26A and 26B), and the reception data analyzing processing which was performed at the gateway 102 is also omitted.

While the data transmission destination from the voice input/output device 240 was the gateway 102 in the first embodiment (FIGS. 19 through 21), this is the central management device 2800 in the second embodiment (FIGS. 26A and 26B). Except for the above points, the operations of the speech dialogue system according to the second embodiment are the same as those of the first embodiment.

Specifically, in S1501 the voice data has been directly transmitted from the voice input/output device 240 to the central management device 2800, so the processing of S1505 is omitted. Accordingly, the gateway ID is not transmitted along with the voice data. Also, in FIG. 26A, the gateway 102 has been omitted, so transmission of the device ID and gateway ID to the gateway 102 is omitted in S1550 in FIG. 26A, unlike S1550 in FIG. 19.

The control command, authority state display content, and voice data are each directly transmitted from the central management device 2800 to the devices 400, display terminal 260, and voice input/output device 240. Accordingly, the process group C is also omitted in FIG. 26A.

Thus, advantages the same as those of the first embodiment can be obtained in the second embodiment, even when applied to a form where the functions of the cloud server 111 are borne by the central management device 2800 installed within the group 100.

Other Embodiments

Although a speech dialogue system has been described by way of embodiments, the present disclosure is not restricted to these embodiments. The processing units included in the speech dialogue system according to the above-described embodiments are typically realized as an large-scale integration (LSI) which is an integrated circuit. These may be individually formed into single chips, or part or all may be formed into a single chip. However, the integrated circuit is not restricted to an LSI, and may be realized by dedicated circuits or general-purpose processors. A field programmable gate array (FPGA) capable of being programmed after manufacturing the LSI, or a reconfigurable processor of which the connections and settings of circuit cells within the LSI can be reconfigured, may be used.

In the above-described embodiments, the components may be configured as dedicated hardware, or may be realized by executing a software program suitable for each component. Each component may be realized by a program execution unit such as a processor reading out a software program stored in a recording medium such as a hard disk, semiconductor memory, or the like, and executing the software program.

Further, the present disclosure may be the above program, or may be a non-transient computer-readable recording medium in which the program is recorded. It is needless to say that the program may be distributed through a transfer medium such as the Internet or the like.

Also, the numbers used above all are only exemplary to describe the present disclosure in a specific manner, and the present disclosure is not restricted to the exemplified numbers. Also, the connection relations between components used above all are only exemplary to describe the present disclosure in a specific manner, and connection relations to realize the function of the present disclosure are not restricted to these.

Also, the functional block divisions in the block diagrams are only exemplary, and multiple function blocks may be realized as a single functional block, or a single functional block may be divided into a plurality, or a part of the functions may be transferred to another functional block. Functions of multiple functional blocks having similar functions may be processed in parallel or time-division by a single hardware or software.

While a speech dialogue system according to one aspect has been described by way of embodiments, the present disclosure is not restricted to these embodiments. Various modifications to the embodiments and combinations of components of different embodiments which are conceivable by one skilled in the art may be encompassed by one aspect without departing from the essence of the present disclosure.

The present disclosure is not restricted in application to the series of dialogue relating to obtaining weather information described above. The present disclosure is applicable to any arrangement relating to dialogue between a speech dialogue system and a user. For example, a case will be assumed where the user runs a microwave oven or cooking oven which can handle voice operations by giving the instruction "heat it". At this time, the speech dialogue system may ask the user for specific instructions such as "heat for how many minutes?" or "heat to what temperature?", or the like. The only user who can reply to this (the user from which the speech dialogue system will accept an answer to the question) is the user which has instructed to "heat it" at first.

The present disclosure is also applicable to operations of the speech dialogue system asking back detailed contents as to abstract instructions from the user. What the speech dialogue system asks the user back may be confirmation of whether or not the device 400 is actually executing the task, or the like.

The input of voice from the user may be performed by a microphone provided to the speech dialogue system or the device 400. The speech dialogue system or the device 400 asking back to the user may be conveyed from a speaker or the like provided to the speech dialogue system or the device 400.

The sequence diagram illustrated in FIG. 20 has processing, for determining whether or not the user who has spoken is the same as the task owner (S1575), being executed after execution of process group A (reception of voice data and gateway ID (S1510), voice context understanding processing (S1515), speaker distinguishing processing (S1520), and state management processing (S1525)). The present disclosure is not restricted to this, and an arrangement may be made where S1515 and the speaker distinguishing processing (S1520) is executed first, and next the processing of S1575 is executed, and then the voice context understanding processing (S1515) and state management processing (S1525) executed in a case where the user who has spoken and the task owner are the same.

Also, while a user ID is registered to the "task owner" in FIG. 13, the present disclosure is not restricted to this, and voiceprint data may be registered. In this case, the voiceprint data extracted from the voice data input next, and the voiceprint data registered in "task owner" in FIG. 13 are matched, and determination is made regarding the authority of the user who has input the next voice data.

Note that the technology described above may be realized by the following type of cloud service. However, the type of cloud service by which the above technology can be realized is not restricted to this.

Service Type 1: In-House Data Center Type Cloud Service

FIG. 27 is a diagram illustrating the overall image of services which the speech dialogue system provides in a service type 1 (in-house data center type cloud service). This type is a type where a service provider 4120 obtains information from a group 4100, and provides a user with service. In this type, the service provider 4120 functions as a data center operator. That is to say, the service provider 4120 has a cloud server 4111 to manage big data. Accordingly, the data center operator does not exist.

In this type, the service provider 4120 operates and manages the data center 4203 (cloud server). The service provider 4120 also manages operating system (OS) 202 and applications 4201. The service provider 4120 provides services (arrow 204) using the OS 4202 and applications 4201 managed by the service provider 4120.

Service Type 2: IaaS Usage Type Cloud Service

Figure 28:
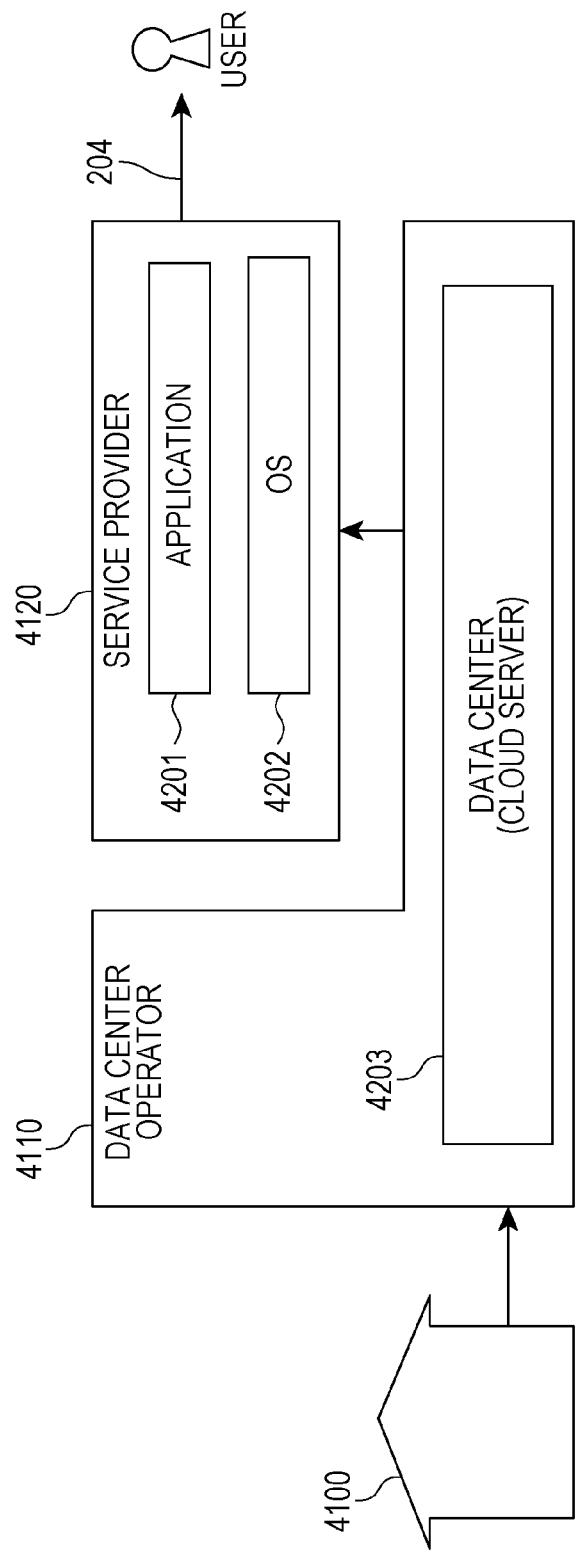
FIG. 28 is a diagram illustrating an overall image of service provided by a speech dialogue system according to a type 2 service (IaaS usage type cloud service)

FIG. 28 is a diagram illustrating the overall image of services which the speech dialogue system provides in a service type 2 (IaaS usage type cloud service). IaaS stands for "Infrastructure as a Service", and is a cloud service providing model where the base for computer system architecture and operation itself is provided as an Internet-based service.

In this type, the data center operator 4110 operates and manages the data center 4203 (cloud server). The service provider 4120 manages the OS 4202 and applications 4201. The service provider 4120 provides services (arrow 204) using the OS 4202 and applications 4201 managed by the service provider 4120.

Service Type 3: PaaS Usage Type Cloud Service

Figure 29:
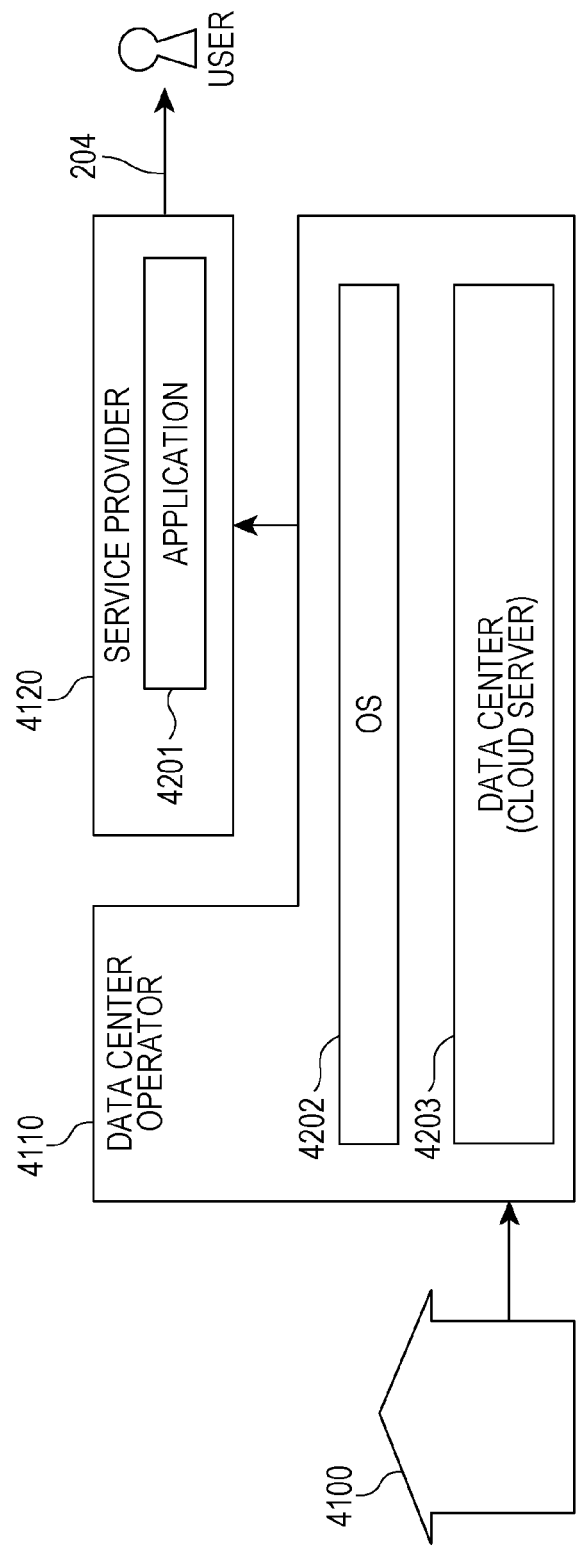
FIG. 29 is a diagram illustrating an overall image of service provided by a speech dialogue system according to a type 3 service (PaaS usage type cloud service)

FIG. 29 is a diagram illustrating the overall image of services which the speech dialogue system provides in a service type 3 (PaaS usage type cloud service). PaaS stands for "Platform as a Service", and is a cloud service providing model where a platform serving as the foundation for software architecture and operation is provided as an Internet-based service.

In this type, the data center operator 4110 manages the OS 4202 and operates and manages the data center 4203 (cloud server). The service provider 4120 also manages the applications 4201. The service provider 4120 provides services (arrow 204) using the OS 4202 managed by the data center operator 4110 and applications 4201 managed by the service provider 4120.

Service Type 4: SaaS Usage Type Cloud Service

FIG. 30 is a diagram illustrating the overall image of services which the speech dialogue system provides in a service type 4 (SaaS usage type cloud service). SaaS stands for "Software as a Service". A SaaS usage type cloud service is a cloud service providing model having functions where corporations or individuals who do not have a data center (cloud server) can use applications provided by a platform provider having a data center (cloud server) for example, over a network such as the Internet.

In this type, the data center operator 4110 manages the applications 4201, manages the OS 4202, and operates and manages the data center 4203 (cloud server). The service provider 4120 provides services (arrow 204) using the OS 4202 and applications 4201 managed by the data center operator 4110.

In each of these types, the service provider 4120 performs the act of providing services. The service provider or data center operator may develop the OS, applications, database for big data, and so forth, in-house, or may commission this to a third party.

The present disclosure is advantageous in the technology of controlling devices using voice.

What is claimed is:

1. A speech dialogue control method of a speech dialogue system where connection is made to a voice input device that inputs user voice, the method comprising:
    receiving first instruction information, representing a first instruction to the speech dialogue system, from the voice input device;
    extracting first voice information, indicating first voiceprint data of a first user who has input the first instruction information, contained in the received first instruction information, and recognizing the first instruction in order to identify processing to be executed;
    requesting the first user to input complementary information of the first instruction information to uniquely identify the processing, when it is determined that the first instruction information is not complete enough to uniquely identify the processing;
    extracting, from utterance information which is voice uttered by a second user that has been received from the voice input device after the requesting, second voice information indicating second voiceprint data of the second user who has input this utterance information;
    determining whether or not the first voice information and the second voice information that have been extracted match to determine whether or not the first user is identical to the second user; and
    when determination is made that the first voice information and the second voice information do not match, executing processing to make notification to the effect that input of the utterance information cannot be accepted, or not executing processing identified based on the first instruction, the first voice information and the second voice information that have been input.

2. The speech dialogue control method according to claim 1,
    wherein, when second instruction information indicating a second instruction to uniquely identify the processing has been received from the voice input device as the utterance information, the second instruction which the second instruction information represents is recognized, processing to be executed is uniquely identified based on the recognition result of the first instruction and the second instruction, the second voice information indicating the second voiceprint of the second user who has input the second instruction information is extracted from the second instruction information, and whether or not the first voice information and the second voice information match is determined.

3. The speech dialogue control method according to claim 2,
    wherein, when determination is made that the first voice information and the second voice information match, the identified processing is executed.

4. The speech dialogue control method according to claim 1,
    wherein, when the first voice information and the second voice information match, a speech content which the received utterance information represents is recognized, it is determined that the processing to be executed is uniquely identified based on the first instruction and the recognition results of the speech content, and the identified processing is executed.

5. The speech dialogue control method according to claim 4,
    wherein the identified processing is search processing to search for any information.

6. The speech dialogue control method according to claim 4,
    wherein the speech dialogue system is further connected to an electric appliance,
    and wherein the identified processing is control processing to control operations of the electric appliance.

7. The speech dialogue control method according to claim 4,
    wherein, in a case where execution of the identified processing has ended, the speech dialogue between the first user and the speech dialogue system is ended, and a speech reception state of the speech dialogue system is set to neutral.

8. The speech dialogue control method according to claim 1,
    wherein the extracted first voice information is stored in memory,
    and wherein the first voice information is read out from the memory, and whether or not the first voice information and the second voice information match is determined.

9. The speech dialogue control method according to claim 1,
    wherein, when a predetermined amount of time elapses after the requesting, the speech dialogue between the first user and the speech dialogue system is ended, and a speech reception state of the speech dialogue system is set to neutral.

10. The speech dialogue control method according to claim 1,
    wherein the voice input device and the speech dialogue system are connected by a network,
    and wherein, in a case of detecting that connection by the network has been cut off after the requesting, the speech dialogue between the first user and the speech dialogue system is ended, and a speech reception state of the speech dialogue system is set to neutral.

11. The speech dialogue control method according to claim 1,
    wherein the voice input device and the speech dialogue system are connected by a network, and wherein, in a case of detecting that connection by the network has been cut off after the requesting, the speech dialogue between the first user and the speech dialogue system is ended, and the first user is notified that the network has been cut off.

12. The speech dialogue control method according to claim 11,
wherein notification to the first user that the network has been cut off is performed by outputting voice indicating the cutoff.

13. The speech dialogue control method according to claim 11,
wherein notification to the first user that the network has been cut off is performed by outputting an image indicating the cutoff.

* * * * *